(12) United States Patent
Barbati et al.

(10) Patent No.: US 11,702,367 B2
(45) Date of Patent: Jul. 18, 2023

(54) BINDER JETTING IN ADDITIVE MANUFACTURING OF INHOMOGENEOUS THREE-DIMENSIONAL PARTS

(71) Applicant: Desktop Metal, Inc., Burlington, MA (US)

(72) Inventors: Alexander Barbati, Cambridge, MA (US); Michael Andrew Gibson, Boston, MA (US); Nihan Tuncer, Cambridge, MA (US); Brian Kernan, Andover, MA (US)

(73) Assignee: Desktop Metal, Inc., Burlington, MA (US)

( * ) Notice: Subject to any disclaimer, the term of this patent is extended or adjusted under 35 U.S.C. 154(b) by 275 days.

(21) Appl. No.: 16/328,012

(22) PCT Filed: Oct. 17, 2018

(86) PCT No.: PCT/US2018/056348
§ 371 (c)(1),
(2) Date: Feb. 25, 2019

(87) PCT Pub. No.: WO2019/079497
PCT Pub. Date: Apr. 25, 2019

(65) Prior Publication Data
US 2021/0331242 A1 Oct. 28, 2021

Related U.S. Application Data

(60) Provisional application No. 62/573,410, filed on Oct. 17, 2017.

(51) Int. Cl.
*C04B 35/111* (2006.01)
*B33Y 10/00* (2015.01)
(Continued)

(52) U.S. Cl.
CPC .............. *C04B 35/111* (2013.01); *B22F 1/10* (2022.01); *B22F 10/14* (2021.01); *B22F 12/55* (2021.01);
(Continued)

(58) Field of Classification Search
CPC .......... B22F 10/14; B22F 12/55; B28B 1/001; B29C 64/165; B33Y 10/00; B33Y 30/00;
(Continued)

(56) References Cited

U.S. PATENT DOCUMENTS

2014/0322501 A1* 10/2014 Ederer ...................... B22C 9/10
428/206
2016/0271698 A1* 9/2016 Schmidt .................. B22F 10/20
(Continued)

*Primary Examiner* — Michael M. Robinson
(74) *Attorney, Agent, or Firm* — Jonathan D. Hall; Oak Law, PLLC

(57) ABSTRACT

Devices, systems, and methods are directed to binder jetting for forming three-dimensional parts having controlled, macroscopically inhomogeneous material composition. In general, a binder may be delivered to each layer of a plurality of layers of a powder of inorganic particles. An active component may be introduced, in a spatially controlled distribution, to at least one of the plurality of layers such that the binder, the powder of inorganic particles, and the active component, in combination, form an object. The object may be thermally processed into a three-dimensional part having a gradient of one or more physicochemical properties of a material at least partially formed from thermally processing the inorganic particles and the active component of the object.

15 Claims, 9 Drawing Sheets

(51) Int. Cl.
  *B33Y 80/00*   (2015.01)
  *B33Y 50/02*   (2015.01)
  *B33Y 30/00*   (2015.01)
  *C04B 35/634*  (2006.01)
  *C04B 35/565*  (2006.01)
  *B29C 64/165*  (2017.01)
  *B33Y 70/10*   (2020.01)
  *B22F 10/14*   (2021.01)
  *B22F 12/55*   (2021.01)
  *B28B 1/00*    (2006.01)
  *C09D 11/023*  (2014.01)
  *C09D 11/033*  (2014.01)
  *C09D 11/037*  (2014.01)
  *C09D 11/10*   (2014.01)
  *C09D 11/322*  (2014.01)
  *C09D 11/38*   (2014.01)
  *C09D 11/54*   (2014.01)
  *B22F 1/10*    (2022.01)
  *B22F 12/33*   (2021.01)
  *B22F 10/30*   (2021.01)

(52) U.S. Cl.
  CPC ............ *B28B 1/001* (2013.01); *B29C 64/165* (2017.08); *B33Y 10/00* (2014.12); *B33Y 30/00* (2014.12); *B33Y 50/02* (2014.12); *B33Y 70/10* (2020.01); *B33Y 80/00* (2014.12); *C04B 35/565* (2013.01); *C04B 35/63488* (2013.01); *C09D 11/023* (2013.01); *C09D 11/033* (2013.01); *C09D 11/037* (2013.01); *C09D 11/10* (2013.01); *C09D 11/322* (2013.01); *C09D 11/38* (2013.01); *C09D 11/54* (2013.01); *B22F 10/30* (2021.01); *B22F 12/33* (2021.01); *B22F 2207/01* (2013.01); *B22F 2207/11* (2013.01); *C04B 2235/6026* (2013.01)

(58) Field of Classification Search
  CPC ....... B33Y 50/02; B33Y 80/00; C09D 11/023; C09D 11/033; C09D 11/037; C09D 11/10; C09D 11/322; C09D 11/38; C09D 11/54
  See application file for complete search history.

(56)               References Cited

U.S. PATENT DOCUMENTS

2017/0120329 A1*  5/2017  Orange ................. B22F 12/52
2020/0016829 A1*  1/2020  Ameloot ............... B29C 64/165

* cited by examiner

BINDER JETTING IN ADDITIVE MANUFACTURING OF INHOMOGENEOUS THREE-DIMENSIONAL PARTS

CROSS-REFERENCE TO RELATED APPLICATIONS

This application claims priority to U.S. Provisional Patent Application No. 62/573,410, filed Oct. 17, 2017, the entire contents of which are incorporated herein by reference.

BACKGROUND

Binder jetting is an additive manufacturing technique useful for rapid fabrication of parts, including parts made of metal and having complex geometry. In particular, binder jetting is a layer-by-layer fabrication process in which a binder is jetted onto successive layers of a powder in a powder bed such that the layers of the powder adhere to one another, along the areas of distribution of the binder, to form a three-dimensional green part. Through subsequent processing, the three-dimensional green part can be formed into a finished three-dimensional part having a generally homogeneous composition and, thus, generally homogenous material properties. While parts with homogenous material properties are useful in certain applications, there are a number of applications in which it is desirable to form a three-dimensional part having controlled spatial variation of material properties. Such controlled spatial variation of material properties, however, is difficult to achieve with binder jetting techniques. Accordingly, there remains a need for improved spatial control over material properties in finished three-dimensional parts formed using binder jetting processes.

SUMMARY

Devices, systems, and methods are directed to binder jetting for forming three-dimensional parts having controlled, macroscopically inhomogeneous material composition. In general, a binder may be delivered to each layer of a plurality of layers of a powder of inorganic particles. An active component may be introduced, in a spatially controlled distribution, to at least one of the plurality of layers such that the binder, the powder of inorganic particles, and the active component, in combination, form an object. The object may be thermally processed into a three-dimensional part having a gradient of one or more physicochemical properties of a material at least partially formed from thermally processing the inorganic particles and the active component of the object.

According to one aspect, an additive manufacturing method may include forming a plurality of layers of a powder along a powder bed, the powder including inorganic particles (e.g., ceramic particles, metallic particles, or a combination thereof), delivering one or more binders (e.g., at least one of a polymer, a salt, nanoparticles, or a gel) to the plurality of layers, depositing an additive to one or more layers of the plurality of layers, the additive including an active component in a higher volumetric concentration in the additive than in each of the one or more binders, and the one or more binders, the plurality of layers, and the active component, in combination, forming an object, and thermally processing the object into a three-dimensional part having, in at least an area of the three-dimensional part corresponding to a distribution of the active component of the object, a gradient of one or more physicochemical properties of a material at least partially formed from thermally processing the inorganic particles and the active component of the object.

In some implementations, forming the plurality of layers of the powder along the powder bed may include spreading each layer of the plurality of layers of the powder across the powder bed. Additionally, or alternatively, the one or more binders may be deposited to the plurality of layers of the powder between formation of successive layers of the plurality of layers of the powder. Further, or instead, depositing the one or more binders to the plurality of layers may include jetting the one or more binders to the plurality of layers. For example, the one or more binders may be jetted to the plurality of layers from one or more printheads moving over each layer of the plurality of layers.

In certain implementations, each binder of the one or more binders may be delivered to one or more of the layers of the plurality of layers in a respective controlled two-dimensional pattern based on the respective binder and a given layer.

In some implementations, depositing the additive to the one or more layers of the plurality of layers may include jetting the additive to the one or more of the layers.

In certain implementations, in at least one of the layers of the plurality of layers, the additive may at least partially overlaps the one or more binders. Further, or instead, the one or more binders may be delivered to the plurality of layers separate from depositing the additive to the one or more of the layers.

In some implementations, the one or more binders may include a first binder, and the additive includes a second binder. The second binder may be different from the first binder. Additionally, or alternatively, at least one of the first binder and the second binder includes one or more of poly(acrylic acid), a latex suspension, or poly(vinyl alcohol).

In certain implementations, the active component may include carbon (e.g., one or more of carbon black, graphene, carbon nanotubes, or silicon carbide). Further, or instead, the active component may include boron (e.g., one or more of pyrolyzed boron nitride or elemental boron). Additionally, or alternatively, the active component may include one or more of tungsten or molybdenum. Still further or instead, the active component may include one or more interstitial elements in a phase of the three-dimensional part. For example, the three-dimensional part may include a ferrous phase, and the one or more interstitial elements may include one or more of carbon, sulfur, nitrogen, hydrogen, boron, phosphorous, oxygen, or silicon.

In some implementations, the additive may include the active component disposed in a carrier.

In certain implementations, the active component may be undissolved in the carrier. For example, the additive may include particles of the active component stably suspended in the carrier. The particles of the active component may be hydrophobic. As a specific example, the particles of the active component may include carbon particles and the carrier may include water and at least one surfactant (e.g., one or more of an anionic surfactant, a cationic surfactant, a zwitterionic surfactant, or non-ionic surfactant). In certain instances, the particles of the active component may include a size distribution ranging from greater than about 1 nm to less than about 5000 nm. Further, or instead, the particles of the active component may include a metal (e.g., one or more of iron or chromium). Additionally, or alternatively, the particles of the active component may differ in composition from the inorganic particles of the powder.

In some implementations, the carrier may include a solvent (e.g., one or more of water, an aromatic organic substance, an aliphatic organic substance, alcohol, or a surfactant), and the active component may be dissolved in the solvent.

In certain implementations, at least a portion of the gradient of the one or more physicochemical properties of the material may be along a surface of the three-dimensional part. For example, at least a portion of the gradient of the one or more physicochemical properties of the material may be perpendicular to the surface of the three-dimensional part. Further, or instead, at least a portion of the gradient of the one or more physicochemical properties of the material may be parallel to the surface of the three-dimensional part.

In some implementations, at least a portion of the gradient of the one or more physicochemical properties of the material may be within the three-dimensional part, away from surfaces of the three-dimensional part.

In certain implementations, the inorganic particles and the active component may be adjacent to one another in the object as the object is thermally processed. Further, or instead, thermally processing the object may include chemically reacting the inorganic particles with the active component to form the material having the gradient of the one or more physicochemical properties. Additionally, or alternatively, thermally processing the object may include chemically reacting at least one of the inorganic particles or the active component with one or more process gases to form the material having the gradient of the one or more physicochemical properties. Still further or instead, thermally processing the object may include exposing the inorganic particles and the active component to a peak temperature of greater than about 500° C. and less than about 2100° C.

In some implementations, thermally processing the object may include densifying the object into the three-dimensional part, the object having a first density and the three-dimensional part having a second density greater than the first density. For example, the second density may be at least 90 percent of a theoretical density of the material formed from thermally processing the inorganic particles and the active component.

In certain implementations, the object may have a first resistance to tension along a direction, the three-dimensional part may have a second resistance to tension along the direction, and the second resistance to tension may be greater than the first resistance to tension along the direction.

In some implementations, the object may have a first thermal conductivity and the three-dimensional part may have a second thermal conductivity greater than the first thermal conductivity.

In certain implementations, the object may have a first electrical conductivity and the three-dimensional part may have a second electrical conductivity greater than the first electrical conductivity.

In some implementations, thermally processing the object includes sintering the object. Thermally processing the object may, further or instead, include infiltrating the object with a liquid metal.

In certain implementations, the material at least partially formed from thermally processing the inorganic particles and the active component of the object may be an alloy. As an example, the alloy may be steel, and the active component may include any one or more of carbon, boron, sulfur, phosphorus, antimony, fluorine, bismuth, arsenic, tin, lead, tellurium, or manganese. As an additional or alternative example, the alloy may be an aluminum alloy, and the active component of the additive may include gallium. As a further or alternative example, the alloy may be a copper alloy, and the active component may include one or more of bismuth, antimony, tellurium, zirconium, or chromium. Additionally, or alternatively, the alloy may be a free-machining material.

In some implementations, the material at least partially formed from thermally processing the inorganic particles and the active component of the object may be a matrix material. For example, the active component may be unreacted in the matrix material.

In certain implementations, in the three-dimensional part, the gradient of the one or more physicochemical properties of the material at least partially formed from reaction of the inorganic particles with the active component may be monotonic in at least one direction along the three-dimensional part.

According to another aspect, an additive manufacturing method may include forming a plurality of layers of a powder along a powder bed, the powder including inorganic particles, delivering one or more binders to the plurality of layers, depositing an additive to one or more layers of the plurality of layers, the additive including at least one salt, and the one or more binders, the plurality of layers, and the at least one salt, in combination, forming an object, and thermally processing the object into a three-dimensional part having, in at least an area of the three-dimensional part corresponding to a distribution of the at least one salt of the object, a gradient of one or more physicochemical properties of a material at least partially formed from the inorganic particles and the at least one salt through thermal processing of the object.

In certain implementations, depositing the additive to the one or more layers of the plurality of layers may include jetting the additive to the one or more layers of the plurality of layers.

In some implementations, the additive may include a solvent (e.g., water) and the at least one salt is dissolved in the solvent.

In certain implementations, the at least one salt may be a metal-containing salt. In some instances, the inorganic particles may include metallic particles, and the material at least partially formed from the inorganic particles and the at least one salt may be an alloy at least partially formed from the metallic particles and metal of the metal-containing salt. As an example, along a first portion of the gradient in the three-dimensional part, the alloy may be stainless steel. Further, or instead, along a second portion of the gradient in the three-dimensional part, the alloy may be tool steel, and the second portion of the gradient may be different from the first portion of the gradient. In certain instances, the at least one salt may include one or more of a boron-containing salt, a tungsten-containing salt (e.g., one or more of ammonium paratungstate and ammonium heptamolybdate, or a molybdenum-containing salt (e.g., one or more of ammonium orthomolybdate, ammonium heptamolybdate, ammonium phosphomolybdate, and ammonium tetrathiomolybdate).

In some implementations, thermally processing the object may include one or more of sintering the object or infiltrating the object with a liquid metal.

In certain implementations, at least a portion of the gradient of the one or more physicochemical properties of the material may be along a surface of the three-dimensional part. For example, at least a portion of the gradient of the one or more physicochemical properties of the material may be perpendicular to the surface of the three-dimensional part. Further or instead, at least a portion of the gradient of the one or more physicochemical properties of the material may be parallel to the surface of the three-dimensional part.

In some implementations, at least a portion of the gradient of the one or more physicochemical properties of the material may be within the three-dimensional part, away from surfaces of the three-dimensional part.

In some implementations, in the three-dimensional part, the gradient of the one or more physicochemical properties of the material at least partially formed from reaction of the inorganic particles with the at least one salt may be monotonic in at least one direction along the three-dimensional part.

In certain implementations, the inorganic particles and the at least one salt may be adjacent to one another in the object as the object is thermally processed. Further, or instead, thermally processing the object may include chemically reacting the inorganic particles with the at least one salt to form the material having the gradient of the one or more physicochemical properties. Further, or instead, thermally processing the object may include chemically reacting at least one of the inorganic particles or the at least one salt with one or more process gases to form the material having the gradient of the one or more physicochemical properties. Additionally, or alternatively, thermally processing the object includes exposing the inorganic particles and the at least one salt to a peak temperature of greater than about 500° C. and less than about 2100° C.

According to yet another aspect, an additive manufacturing method may include forming a plurality of layers of a powder along a powder bed, the powder including inorganic particles (e.g., metallic particles), delivering one or more binders to the plurality of layers, depositing an additive to one or more layers of the plurality of layers, the additive including a first polymer (e.g., poly(ethylene glycol) and particles of an active component attached to the first polymer, and the one or more binders, the plurality of layers, and the additive, in combination, forming an object, and thermally processing the object into a three-dimensional part having, in at least an area of the three-dimensional part corresponding to a distribution of the particles of the active component of the object, a gradient of one or more physicochemical properties of a material at least partially formed from thermally processing the inorganic particles and the active component of the object.

In certain implementations, a volumetric concentration of the particles of the active component may be higher in the additive than in the one or more binders.

In some implementations, the first polymer may be covalently grafted to surfaces of the particles of the active component.

In certain implementations, the first polymer may be physically adsorbed to surfaces of the particles of the active component. For example, physical adsorption of the first polymer may be ionic.

In some implementations, the particles of the active component may be silicon-based and include a silicon dioxide surface group.

In certain implementations, the particles of the active component may have a metal oxide surface chemistry.

In some implementations, the particles of the active component may include an oxide coating, and the first polymer may be silane-terminated.

In some implementations, the first polymer may be thiol-terminated, and the particles of the active component may have a surface group of at least one of gold, platinum, silver, silicon, and silicon dioxide.

In certain implementations, the first polymer may be carboxyl-terminated, and the particles of the active component may have a surface group of at least one of gold, silver, silver oxide, aluminum oxide, silicon, silicon dioxide, copper, and a coper oxide.

In some implementations, thermally processing the object may separate the particles of the active component from the first polymer.

In certain implementations, in the three-dimensional part, the gradient of the one or more physicochemical properties of the material at least partially formed from reaction of the inorganic particles with the particles of the active component may be monotonic in at least one direction along the three-dimensional part.

In some implementations, at least a portion of the gradient of the one or more physicochemical properties of the material may be along a surface of the three-dimensional part. For example, at least a portion of the gradient of the one or more physicochemical properties of the material may be perpendicular to the surface of the three-dimensional part. Further, or instead, at least a portion of the gradient of the one or more physicochemical properties of the material may be parallel to the surface of the three-dimensional part.

In certain implementations, at least a portion of the gradient of the one or more physicochemical properties of the material may be within the three-dimensional part, away from surfaces of the three-dimensional part.

In some implementations, thermally processing the object may include one or more of sintering the object or infiltrating the object with a liquid metal.

In some implementations, the inorganic particles and the active component may be adjacent to one another in the object as the object is thermally processed. Further, or instead, thermally processing the object may include chemically reacting the inorganic particles with the active component to form the material having the gradient of the one or more physicochemical properties. Additionally, or alternatively, thermally processing the object may include chemically reacting at least one of the inorganic particles or the active component with one or more process gases to form the material having the gradient of the one or more physicochemical properties. Still further or instead, thermally processing the object may include exposing the inorganic particles and the active component to a peak temperature of greater than about 500° C. and less than about 2100° C.

In certain implementations, the one or more binders may include a second polymer. The second polymer may be, for example, different from the first polymer.

In some implementations, the one or more binders include at least one of a salt, nanoparticles, or a gel.

According to still another aspect, an additive manufacturing method may include forming a plurality of layers of a powder across a powder bed, the powder including inorganic particles (e.g., metallic particles), delivering at least one binder to the plurality of layers of the powder, selectively decomposing the at least one binder to form an active component, the at least one binder, the plurality of layers, and the active component, in combination, forming an object, and thermally processing the object into a three-dimensional part having, in at least an area of the three-dimensional part corresponding to the active component of the object, a gradient of one or more physicochemical properties of a material at least partially formed from thermally processing the inorganic particles and the active component of the object.

In certain implementations, the material at least partially formed from thermally processing the inorganic particles and the active component of the object may be an alloy. For example, the alloy may have a lower melting point than a metal formed from the metallic particles alone. Further, or instead, the alloy may be steel.

In some implementations, the material at least partially formed from thermally processing the inorganic particles and the active component of the object may be a matrix material. For example, the active component may be unreacted in the matrix material.

In certain implementations, the active component yielded from selective decomposition of the at least one binder may include a first component and a second component, the first component may be carbon, and the second component may be different from the first component.

In some implementations, the at least one binder may include a salt and decomposing at least a portion of the at least one binder includes decomposing the salt.

In certain implementations, the at least one binder may include a polymer and decomposing at least a portion of the at least one binder may include thermal pyrolysis of the polymer.

In some implementations, forming the plurality of layers of the powder may include spreading the powder across the powder bed to form each layer.

In certain implementations, the inorganic particles and the active component may be adjacent to one another in the object as the object is thermally processed. Further, or instead, thermally processing the object may include chemically reacting the inorganic particles with the active component to form the material having the gradient of the one or more physicochemical properties. Additionally, or alternatively, thermally processing the object may include chemically reacting at least one of the inorganic particles or the active component with one or more process gases to form the material having the gradient of the one or more physicochemical properties. Still further or instead, thermally processing the object may include exposing the inorganic particles and the active component to a peak temperature of greater than about 500° C. and less than about 2100° C.

In some implementations, thermally processing the object to form the three-dimensional part may include densifying the object, with the object having a first density and the three-dimensional part having a second density greater than the first density.

In certain implementations, the object may have a first resistance to tension along a direction, the three-dimensional part has a second resistance to tension along the direction, and the second resistance to tension is greater than the first resistance to tension along the direction.

In some implementations, the object may have a first thermal conductivity and the three-dimensional part may have a second thermal conductivity greater than the first thermal conductivity.

In certain implementations, the object may have a first electrical conductivity and the three-dimensional part may have a second electrical conductivity greater than the first electrical conductivity.

In some implementations, thermally processing the object may include one or more of sintering the object or infiltrating the object with a liquid metal.

In certain implementations, selectively decomposing the at least one binder may include thermally decomposing at least a portion of the binder.

In some implementations, at least a portion of the gradient of the one or more physicochemical properties of the material may be along a surface of the three-dimensional part. Further, or instead, at least a portion of the gradient of the one or more physicochemical properties of the material may be within the three-dimensional part, away from surfaces of the three-dimensional part.

According to still another aspect, an additive manufacturing method may include forming a plurality of layers of a powder across a powder bed, the powder including inorganic particles, delivering at least one binder to the plurality of layers of the powder, depositing an ink to one or more layers of the plurality of layers, the ink chemically modifying the at least one binder to form an active component, the at least one binder, the plurality of layers, and the active component, in combination, forming an object, and thermally processing the object into a three-dimensional part having, in at least an area of the three-dimensional part corresponding to the active component of the object, a gradient of one or more physicochemical properties of a material at least partially formed from thermally processing the inorganic particles and the active component of the object.

In some implementations, the at least one binder may include a salt, and chemical modification of the salt may change volatility of the salt. For example, the salt may include vanadium salt. In some instances, the ink may include an ionic solution (e.g. including vanadium chloride) that increases volatility of the vanadium salt. Additionally, or alternatively, the ink may include an ionic solution that decreases volatility of the vanadium salt.

In certain implementations, thermally processing the object may include densifying the object.

In some implementations, chemical modification of the binder may include changing volatility of the binder in response to thermally processing the object into the three-dimensional part.

In certain implementations, thermally processing the object may include one or more of sintering the object or infiltrating the object with a liquid metal.

In some implementations, the active component may include one or more interstitial elements in a phase of the three-dimensional part.

In certain implementations, the inorganic particles include metallic particles. In some instances, the material at least partially formed from reaction of the inorganic particles with the active component during thermal processing may be an alloy.

In some implementations, the material at least partially formed from thermally processing the inorganic particles and the active component of the object may be a matrix material. The active component may be unreacted in the matrix material.

In certain implementations, thermally processing the object may include sintering the object. Additionally, or alternatively, thermally processing the object may include infiltrating the object with a liquid metal.

In some implementations, at least a portion of the gradient of the one or more physicochemical properties of the material may be along a surface of the three-dimensional part. For example, at least a portion of the gradient of the one or more physicochemical properties of the material may be perpendicular to the surface of the three-dimensional part. Additionally, or alternatively, at least a portion of the gradient of the one or more physicochemical properties of the material may be parallel to the surface of the three-dimensional part.

In certain implementations, at least a portion of the gradient of the one or more physicochemical properties of the material may be within the three-dimensional part, away from surfaces of the three-dimensional part.

In some implementations, the inorganic particles and the active component may be adjacent to one another in the object as the object is thermally processed. Further, or instead, thermally processing the object may include chemically reacting the inorganic particles with the active component to form the material having the gradient of the one or more physicochemical properties. Additionally, or alternatively, thermally processing the object may include chemically reacting at least one of the inorganic particles or the active component with one or more process gases to form the material having the gradient of the one or more physicochemical properties. Still further, or instead, thermally processing the object includes exposing the inorganic particles and the active component to a peak temperature of greater than about 500° C. and less than about 2100° C.

According to yet another aspect, an object may include a plurality of layers of a powder, the powder including inorganic particles, at least one binder along a respective two-dimensional pattern in each layer of the plurality of layers, the at least one binder binding each layer to one or more adjacent layers, and an active component at one or more target locations of one or more layers of the plurality of layers, wherein the at least one binder, the inorganic particles of the powder, and the active component, in combination, form the object, and the object is thermally processable to form a three-dimensional part having, in areas of the three-dimensional part corresponding to the target locations of the active component of the object, a gradient of one or more physicochemical properties of a material at least partially formable from thermal processing of the inorganic particles and the active component of the object.

In some implementations, the inorganic particles may include metallic particles. The metallic particles may be, for example, alloyable with the active component. For example, an alloy formable from the metallic particles and the active component (e.g., a chromate solution) may have greater corrosion resistance than the metallic particles alone. As an additional or alternative example, the metallic particles and the active component may be alloyable to form steel, and the active component may include any one or more of sulfur, phosphorus, antimony, fluorine, bismuth, arsenic, tin, lead, tellurium, or manganese. As still a further or alternative example, the metallic particles and the active component may be alloyable to form an aluminum alloy, and the active component may include gallium. Further, or instead, the metallic particles and the active component may be alloyable to form a copper alloy, and the active component includes one or more of bismuth, antimony, or tellurium. Additionally, or alternatively, the metallic particles and the active component are alloyable to form a free-machining material. Further, or instead, the metallic particles and the active component may be alloyable to form an alloy having a lower melting point than a melting point of a metal formed from the metallic particles alone. As an example, the metallic particles and the active component may be alloyable to form steel, and the active component includes carbon.

In certain implementations, the target locations of the active component may be at least partially along a surface of the object formed by the at least one binder, the plurality of layers, and the active component. Additionally, or alternatively, the target locations of the active component may be at least partially within the object formed by the at least one binder, the plurality of layers, and the active component.

In some implementations, the object may be sinterable to form the three-dimensional part. Further, or instead, the object may be infiltratable with a liquid metal to form the three-dimensional part. Additionally, or alternatively, the object may be thermally processable to densify the object into the three-dimensional part.

In certain implementations, as compared to the at least one binder, the active component may resist removal through thermal processing.

BRIEF DESCRIPTION OF THE DRAWINGS

The devices, systems, and methods described herein are set forth in the appended claims. However, for the purpose of explanation, several implementations are set forth in the following drawings:

DESCRIPTION

Figure 1:
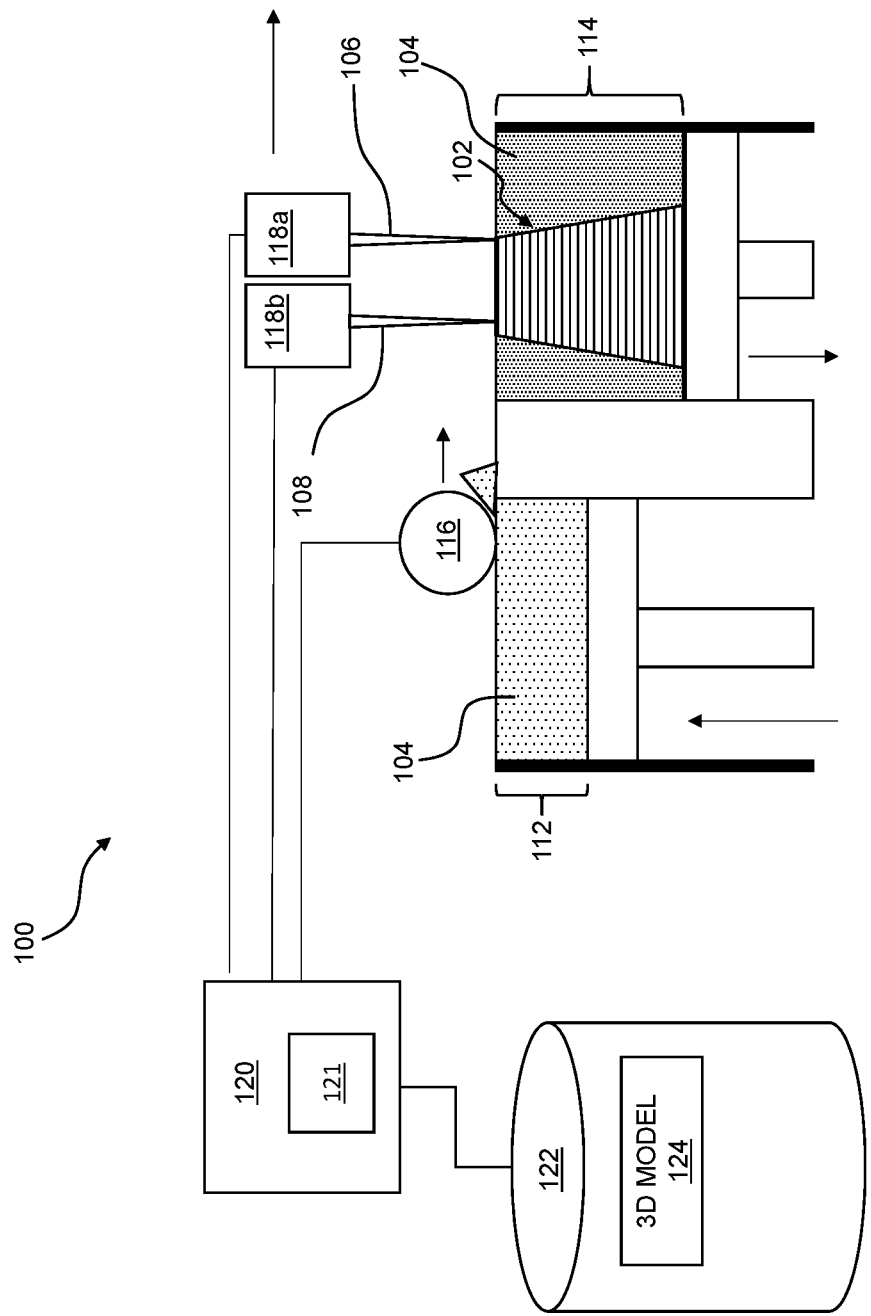
FIG. 1 is a schematic representation of an additive manufacturing system for binder jetting to form an object from a powder in a powder bed.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended to better illuminate the embodiments and, unless otherwise indicated or made clear from the context, should not be understood to impose a limitation on the scope of the embodiments. No language in the specification should be construed as indicating any unclaimed element as essential to the practice of the embodiments.

In the following description, it is understood that terms such as "first," and "second" and the like, are words of convenience and are not to be construed as limiting terms.

As used herein, "binder jetting" shall be understood to refer, generally, to a layer-by-layer additive manufacturing technique in which a powder of particles is spread across a powder bed in successive layers and formed into a plurality of two-dimensional slices stacked on top of one another to define, collectively, a shape of a three-dimensional object. For example, each two-dimensional slice corresponding to a given layer may be formed by delivering one or more binders to at least a portion of the given layer in a respective controlled two-dimensional pattern associated with the layer. The binder may be any of various different materials suitable for substantially maintaining the particles of the powder in place along the two-dimensional slice of a given layer and for adhering the two-dimensional slice of the given layer to the two-dimensional slices of one or more adjacent layers. Thus, for example, as used herein a binder may include any one or more of a polymer or a gel. Additionally, or alternatively, the binder may include nanoparticles that sinter at a lower temperature than the particles of the powder such that the nanoparticles act to hold the particles of the powder in place. Further or instead, while the binder may be jetted from one or more printheads to each layer of the powder of the particles, it should be appreciated that binder jetting does not necessarily require jetting of the binder, as the term jetting is generally understood in fluid mechanics. That is, binder jetting techniques described herein may include any manner and form of controlled delivery of at least one binder from one or more printheads in a direction toward a layer of the powder of the particles on top of a powder bed. Thus, in certain instances, such as instances in which the binder includes a gel, binder jetting techniques described herein may include extrusion of the binder in a controlled-two-dimensional pattern to the layer of the powder on top of the powder bed. Further or instead, unless otherwise indicated or made clear from the context, the binder jetting techniques described herein shall be understood to be applicable to any manner and form of imparting force to a binder for jetting the binder in a direction toward a layer of the powder of the particles. Therefore, depending on composition of the binder, this may include imparting any one or more of mechanical force, thermal excitation, pneumatic force, magnetohydrodynamic force, electrohydrodynamic force, or acoustophoresis to the binder.

In general, the present disclosure is directed to binder jetting-based techniques for additive manufacturing of three-dimensional parts advantageously having a gradient of one or more physicochemical properties. As used herein, physicochemical properties may include any manner and form of physical properties, chemical properties, or combinations thereof, characteristic of a three-dimensional part formed from thermally processing an object formed through the binder jetting techniques described herein. The one or more physicochemical properties may be scalar or tensor-valued. Examples of physicochemical properties, therefore, may include, but are not limited to: melting point, hardness, density, ductility, chemical composition, chemical stability in a given environment, Young's modulus, Poisson's ratio, preferred oxidation state, or combinations thereof.

As used herein, unless otherwise specified or made clear from the context, a gradient of the one or more physicochemical properties shall be understood to include any controlled, macroscopic variation of one or more material properties or material functions in a three-dimensional part. The controlled, macroscopic variation may be distinguishable from nominal variations associated with design tolerances at least because the controlled, macroscopic variation is not random or otherwise uncontrolled and, thus, may be reliably repeated in multiple instances of fabrication of the three-dimensional part. Further, or instead, the gradient of the one or more physicochemical properties may be along any predetermined direction or path defined by the three-dimensional part. For example, at least a portion of the gradient may be along one or more surfaces of the three-dimensional part. As an additional or alternative example, at least a portion of the gradient may be within the three-dimensional part, away from surface of the three-dimensional part.

In certain implementations, the gradient of the one or more physicochemical properties may vary according to a continuous function (e.g., sinusoidally or monotonically in at least one direction of the three-dimensional part) producing a smooth variation of the one or more physicochemical properties over a distance of the predetermined path defined by the three-dimensional part. Such a continuous function may be particularly advantageous, for example, for reducing or eliminating certain mechanical failure modes (e.g., resulting from stress concentration) that may be associated with certain abrupt variations in composition in a part.

In some implementations, however, the gradient of the one or more physicochemical properties may include a sharp change (e.g., substantially a step function to within spatial resolution limitations of a binder jetting system) in the one or more physicochemical properties along the predetermined path defined by the three-dimensional part. As an example, such a sharp change in the one or more physicochemical properties may exist at a transition between an interior portion of the three-dimensional part adjacent to a surface of the three-dimensional part. Continuing with this example, such a sharp change may be useful for forming with one or more physicochemical properties that differ substantially on a surface of the part as compared to along the interior portion of the three-dimensional part.

For the sake of clarity of explanation, a single gradient of one or more physicochemical properties of a material in a three-dimensional part is described. However, unless otherwise indicated or made clear from the context, it should be appreciated that the principals applicable to the single gradient case may be used to form a plurality of gradients of any number of physicochemical properties without departing from the scope of the present disclosure.

Referring now to FIG. 1, an additive manufacturing system 100 may be used to form an object 102 at least partially from a combination of a powder 104 including inorganic particles (e.g., metallic particles, ceramic particles, or a combination thereof), at least one binder 106, and an active component of an additive 108. The object 102, as described in greater detail below, may be thermally processed to form a three-dimensional part (e.g., three-dimensional part 410 in FIG. 4) having a gradient of one or more physicochemical properties of a material at least partially formed from thermally processing the inorganic particles of the powder 104 and the active component of the object 102. As also described in greater detail below, forming a gradient of one or more physicochemical properties in a three-dimensional part formed from thermally processing the object 102 may be useful for fabricating a unitary part suitable for meeting disparate material requirements previously requiring a trade-off in performance in many applications. By way of example, and not limitation, the gradient of the one or more physicochemical properties in the three-dimensional part may facilitate resisting corrosion along one or more surfaces of the three-dimensional part while achieving a high degree of electrical conductivity within the three-dimensional part. By way of further non-liming example, the gradient of the one or more physicochemical properties in the three-dimensional part may provide structural reinforcement to the three-dimensional part, as compared to an analogous three-dimensional part formed without the use of the active component and, thus, does not include the gradient.

The additive manufacturing system 100 may include a powder supply 112, a powder bed 114, a spreader 116, a first printhead 118a, and a second printhead 118b. The spreader 116 may be movable from the powder supply 112 to the powder bed 114 and along the powder bed 114 to spread successive layers of the powder 104 across the powder bed 114. The first printhead 118a and the second printhead 118b may be movable (e.g., in coordination with one another and, optionally, in coordination with movement of the spreader 116) across the powder bed 114.

In general, the first printhead 118a may define one or more orifices (e.g., in a first nozzle) through which the at least one binder 106 may be delivered from the first printhead 118a along a controlled two-dimensional pattern in each layer of the powder 104 along the powder bed 114, and the second printhead 118b may define one or more orifices (e.g., in a second nozzle) through which the additive 108 may be delivered from the second printhead 118b to target locations in at least one layer of a plurality of layers forming the object 102. The at least one binder 106 and the additive 108 may be directed to the powder 104 along the powder bed 114 along individually controlled patterns such that the at least one binder 106, the additive 108, or both may be present in a given layer of the powder 104 forming the object 102 in any of various different patterns suitable for interacting with one another and/or with the powder 104 to form the object 102 such that the object 102 has a material distribution suitable for forming a three-dimensional part meeting predetermined design specifications. That is, as described in greater detail below, the object 102 may be formed, at least in part, by the at least one binder 106, the additive 108 (or, at least, the active component of the additive 108), and the inorganic particles of the powder 104, collectively, and each component of the object 102 has a distribution in the object 102 suitable for forming the gradient of the one or more physicochemical properties in the three-dimensional part formed by thermally processing the object 102.

The spreader 116 may span at least one dimension of the powder bed 114 such that movement of the spreader 116 across the powder bed 114 forms a single layer of the powder 104 along the top of the powder bed 114. The spreader 116 may include, for example, a roller rotatable about an axis perpendicular to an axis of movement of the spreader 116 across the powder bed 114. The roller may be, for example, substantially cylindrical. In use, rotation of the roller about the axis perpendicular to the axis of movement of the spreader 116 may spread the powder 104 from the powder supply 112 to the powder bed 114 and form a layer of the powder 104 along the powder bed 114. More generally, it should be appreciated that the plurality of sequential layers of the powder 104 may be formed in the powder bed 114 through repeated movement of the spreader 116 across the powder bed 114.

In certain implementations, the first printhead 118a and the second printhead 118b may be substantially similar—that is, operating according to the same operating principle. For example, the first printhead 118a and the second printhead 118b may be based on piezoelectric activation for the distribution of fluid. Continuing with this example, the first printhead 118a and the second printhead 118b may each include one or more piezoelectric elements. The one or more piezoelectric elements of the first printhead 118a may be actuated to expel the at least one binder 106 from the respective one or more orifices defined by the first printhead 118a and, similarly, the one or more piezoelectric elements of the second printhead 118b may be actuated to expel the additive 108 from the respective one or more orifices defined by the second printhead 118b. In certain implementations, one or both of the first printhead 118a and the second printhead 118b may expel a respective single liquid formulation from the one or more orifices defined by the respective printhead. In some implementations, however, one or both of the first printhead 118a and the second printhead 118b may expel a plurality of liquid formulations from the one or more orifices. For example, the first printhead 118a may expel a plurality of solvents, a plurality of components of a binder system, or both from the one or more orifices. As another example, while the first printhead 118a and the second printhead 118b may be separate printheads, it should be appreciated that the first printhead 118a and the second printhead 118b may be combined into a single printhead operable to jet the at least one binder 106 and the additive 108 according to any one or more of the methods described herein.

In general, the first printhead 118a may be controlled to deliver (e.g., jet or otherwise distribute) the at least one binder 106 to a layer of the powder 104 along the top of the powder bed 114 in a controlled (e.g., predetermined) two-dimensional pattern associated with the given layer. As used herein, unless otherwise indicated or made clear from the context, the at least one binder 106 may include a liquid or other flowable component such that the at least one binder 106 may be metered (e.g., through the controlled application of force) through one or more orifices defined by the first printhead 118a for controlled deposition along a two-dimensional layer of the powder 104 along the top of the powder bed 114. Additionally, or alternatively, the first printhead 118a may be controlled to control volumetric flow rate of the at least one binder 106 such that concentration of the at least one binder 106 along a layer of the powder on the top of the powder bed 114 may be controllably varied along the two-dimensional pattern of the at least one binder 106 along the layer. Thus, for example, the first printhead 118a may vary concentration of the at least one binder 106 along the layer to achieve a distribution of the at least one binder 106 that facilitates uniform shrinkage of the object 102 as the object 102 undergoes thermal processing.

The second printhead 118b may include any one or more of the features of the first printhead 118a described herein and, thus, in some implementations, may be substantially identical to the first printhead 118a. Further, or instead, while the additive manufacturing system 100 is described as including the first printhead 118a and the second printhead 118b, other configurations are additionally or alternatively possible for directing the at least one binder 106 and the additive 108 to the powder bed 114 to form the object 102. As an example, any one or more features of the second printhead 118b may be incorporated into the first printhead 118a such that the at least one binder 106 and the additive 108 may be delivered through a single printhead. As another example, the at least one binder 106 and the additive 108 may be directed to the powder bed 114 through any number of printheads. More generally, any number of components may be directed to the powder bed 114 through any number of printheads to form the object 102 having any one or more of the various different properties described herein.

The second printhead 118b may be controlled to directly or indirectly deposit an active component to one or more target locations along a layer of the powder 104 on top of the powder bed 114. For example, in certain instances, the active component may form at least a portion of an additive 108 such that delivery of the additive 108 to a given layer of the powder 104 directly introduces the active component to the given layer of the powder 104. Such direct introduction may be useful, for example, for tightly controlling concentration of the active component which, in turn, may be useful for controlling a gradient of material properties in a three-dimensional part formed from the object 102. While direct introduction of the active component to the powder 104 may provide certain advantages, it should be appreciated that the additive 108 distributed by the second printhead 118b may further or instead introduce a precursor of the active component to the powder 104 such that the precursor may chemically react with or decompose the one or more binders to form the active component in situ in the layer of the powder 104. In this context, the precursor distributed by the second printhead 118b may be generally referred to herein as an ink, although the ink is not necessarily limited to fluid including color or otherwise used for printing images. The ink may be a fluid with or without a material dissolved or suspended therein. More generally, unless otherwise indicated or made clear from the context, the additive 108 may be any medium distributable from the second printhead 118b to a layer of the powder 104 to directly or indirectly introduce an active component, such as any one or more of the various active components described herein, into the layer of the powder 104.

The additive manufacturing system 100 may include a controller 120 in electrical communication with the powder supply 112, the powder bed 114, the spreader 116, the first printhead 118a, and the second printhead 118b. The controller 120 may include one or more processors 121 operable to control the powder supply 112, the powder bed 114, the spreader 116, the first printhead 118a, the second printhead 118b, and combinations thereof. In use, the one or more processors 121 of the controller 120 may execute instructions to control z-axis movement of one or more of the powder supply 112 and the powder bed 114 relative to one another as the object 102 is being formed in the powder bed 114. For example, the one or more processors 121 of the controller 120 may execute instructions to move the powder supply 112 in a z-axis direction toward the spreader 116 to direct the powder 104 toward the spreader 116 as each layer of the object 102 is formed. The one or more processors 121 may, also or instead, execute instructions to move the powder bed 114 in a z-axis direction away from the spreader 116 to accept each new layer of the powder 104 along the top of the powder bed 114 as the spreader 116 moves across the powder bed 114. Additionally, or alternatively, the one or more processors 121 of the controller 120 may control movement of the spreader 116 from the powder supply 112 to the powder bed 114 to move successive layers of the powder 104 across the powder bed 114.

Further or instead, the one or more processors 121 of the controller 120 may control movement of the first printhead 118a and the second printhead 118b over the powder bed 114 as the object 102 is being formed. Additionally or alternatively, the one or more processors 121 of the controller 120 may control various different delivery parameters associated with delivery of the at least one binder 106 from the first printhead 118a as the first printhead 118 moves over a layer of the powder 104 on top of the powder bed 114. Similarly, the one or more processors 121 of the controller 120 may control various different distribution parameters of the additive 108 over a layer of the powder 104 on top of the powder bed 114. More generally, the one or more processors 121 of the controller 120 may control the first printhead 118a and the second printhead 118b (e.g., independently of one another) to deliver the at least one binder 106 and the additive 108 to the layer of the powder 104 on top of the powder bed 114 in any manner and form of combination useful for carrying out any one or more of the various different techniques described herein for forming a three-dimensional part having a gradient of one or more physico-chemical properties. In certain implementations, the first printhead 118a may precede the second printhead 118b across the powder bed 114 such that the at least one binder 106 may be delivered onto a given layer of the powder 104 before the additive 108 is distributed onto the given layer of the powder 104. It should be appreciated, however, that the at least one binder 106 and the additive 108 may be directed toward the powder bed 114 in the reverse order in certain implementations. Further or instead, the at least one binder 106 and the additive 108 may be directed onto the powder at the same time or at substantially the same time, such as in implementations in which the first printhead 118a and the second printhead 118b are implemented as a single printhead.

The additive manufacturing system 100 may further include a non-transitory, computer readable storage medium 122 in communication with the controller 120 and having stored thereon a three-dimensional model 124 and instructions for causing the one or more processors 121 to carry out any one or more of the methods described herein. In general, as a plurality of sequential layers of the powder 104 are introduced to the powder bed 114 and the at least one binder 106 and the additive 108 are delivered from the first printhead 118a and the second printhead 118b, respectively, to the powder 104 in the powder bed 114, the object 102 may be formed according to the three-dimensional model 124 stored in the non-transitory, computer readable storage medium 122. In certain implementations, the controller 120 may retrieve the three-dimensional model 124 in response to user input, and generate machine-ready instructions for execution by the additive manufacturing system 100 to fabricate the object 102.

Figure 2:
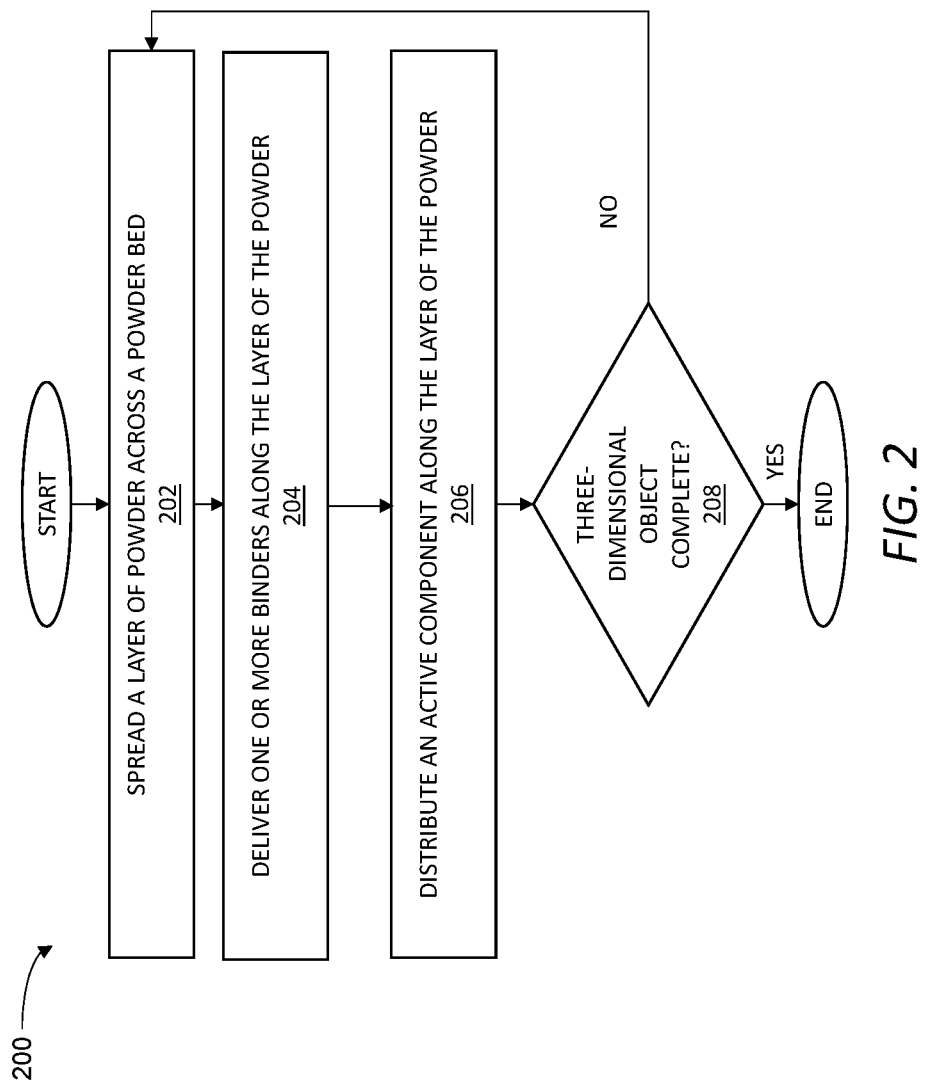
FIG. 2 is a flowchart of an exemplary method of delivering multiple fluids to one or more layers of a plurality of layers of a powder to form an object.
Figure 3C:
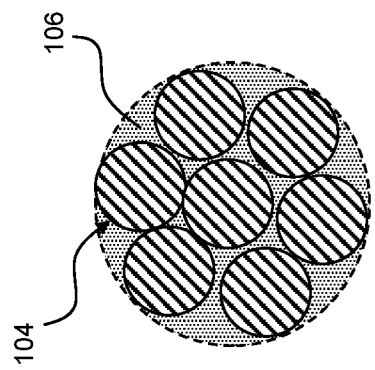
FIG. 3C is a schematic representation of inorganic particles dispersed in a least one binder in a layer of the object of FIG. 3A, the schematic representation corresponding to the area of detail 3C, shown in FIG. 3B.
Figure 3B:
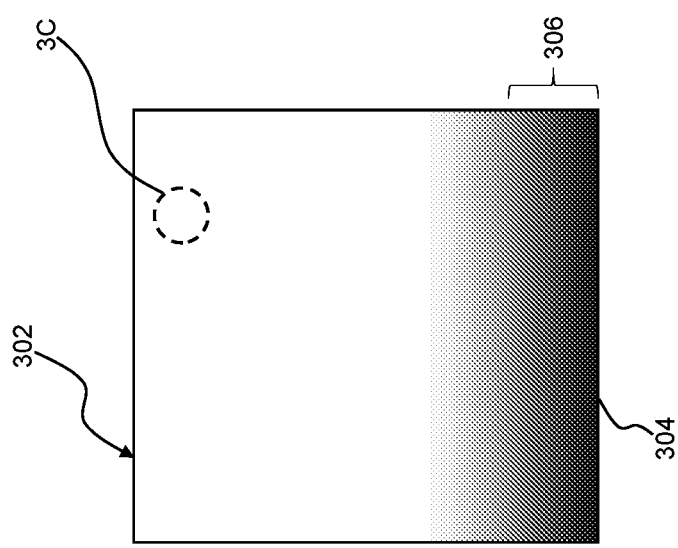
FIG. 3B is a cross-sectional view of the object of FIG. 3A, the cross-section taken along the line 3B-3B in FIG. 3A.
Figure 3A:
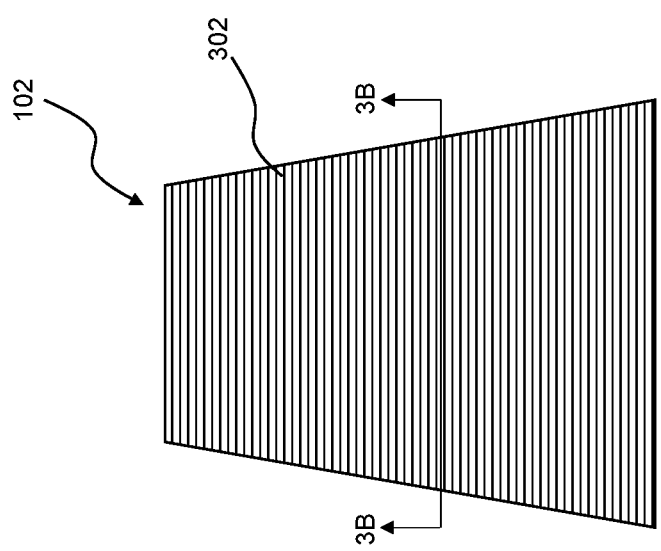
FIG. 3A is a side view of the object of FIG. 1.

FIG. 2 is a flowchart of an exemplary method 200 of delivering multiple fluids to one or more layers of a plurality of layers of a powder to form an object, such as the object 102 (FIG. 1). Unless otherwise specified or made clear from the context, the exemplary method 200 may be implemented using any one or more of the various different additive manufacturing devices and systems described herein. Thus, for example, the exemplary method 200 may be at least partially implemented as computer-readable instructions stored on the computer readable storage medium 122 (FIG. 1) and executable by the controller 120 (FIG. 1) to operate the additive manufacturing system 100 (FIG. 1) to form the object 102 (FIG. 1) according to the three-dimensional model 124 (FIG. 1).

As shown in step 202, the exemplary method 200 may include spreading a layer of a powder across a powder bed. The powder may include inorganic particles and, more generally, may include any one or more of the powders described herein.

As shown in step 204, the exemplary method 200 may include delivering one or more binders along the layer of the powder. The one or more binders may be, for example, any one or more of the binders described herein. Additionally, or alternatively, each binder may be jetted or otherwise delivered to the layer in a respective controlled two-dimensional pattern associated with the respective binder and the layer onto which the binder is introduced.

As shown in step 206, the exemplary method 200 may include distributing an active component along the layer of the powder. The active component may be directly or indirectly distributed along the layer of the powder according to any one or more of the various different techniques described herein for achieving controlled distribution of an active component. Accordingly, introduction of the active component may include direct or indirect introduction of the active component along the layer in a respective controlled two-dimensional arrangement associated with the active component and the layer onto which the second component is introduced. A predetermined gradient of one or more physicochemical properties of a material in a three-dimensional part formed from thermally processing the object being formed may be achieved by selectively controlling, for example, one or more of a two-dimensional distribution pattern and a local concentration of the one or more binders, the active component (e.g., as delivered through an additive or as formed through a reaction or decomposition of the one or more binders or another fluid), or both along a given layer. Thus, as an example, the one or more binders and the active component may be distributed in at least partially overlapping two-dimensional patterns or in segregated patterns in a given layer, with the distribution generally dictated by the gradient of one or more physicochemical properties desired in the three-dimensional part formed by thermally processing of the object.

As shown in step 208, the exemplary method 200 may include repeating, as necessary to form the object, one or more of the steps of spreading a layer of the powder across the powder bed, delivering the one or more binders along a given layer of powder, and distributing the active component along a given layer.

Having described the exemplary method 200 that may be carried out by the additive manufacturing system 100 (FIG. 1) to form the object 102 (FIG. 1) through binder jetting, attention is now turned to various different aspects of the object 102 (FIG. 1). More specifically, it should be appreciated that the object 102 includes features that facilitate fabrication through the use of binder jetting techniques while also being processable into a three-dimensional part having controlled spatial variation, also referred to herein as a gradient, of one or more physicochemical properties. These features of the object 102 are described in greater detail in the description that follows.

Referring now to FIGS. 1 and 3A-3C, the object 102 may be formed by the additive manufacturing system 100 according to any one or more of the methods described herein and, more specifically, may be formed by a combination of components including, but not limited to, the at least one binder 106, the inorganic particles of the powder 104 in a plurality of layers 302, and an active component 304. For example, each layer 302 may include the powder 104 of the inorganic particles held together by the at least one binder 106 along a respective two-dimensional pattern associated with a given instance of the layer 302, and the at least one binder 106 may bind each instance of the layer 302 to one or more adjacent instances of the layer 302. The active component 304 may be disposed along one or more target locations 306 of at least one instance of the layer 302. Thus, in general, the at least one binder 106 may hold the inorganic particles of the powder 104 of the plurality of layers 302 in an overall three-dimensional shape of the object 102, and the selective distribution of the active component 304 along the one or more target locations 306 of the plurality of layers 302 may be useful for imparting a desired distribution of physicochemical properties to a three-dimensional part formed from thermally processing the object 102. That is, as described in greater detail below, the object 102 may be thermally processable to form a three-dimensional part having, in areas of the three-dimensional part corresponding to the target locations 306 of the active component 304 of the object 102, a gradient of one or more physicochemical properties of a material at least partially formable from thermally processing the inorganic particles and the active component 304 of the object 102.

In general, the inorganic particles of the powder 104 may be any of various different types of inorganic material thermally processable to form the three-dimensional part with a desired distribution of physicochemical properties. More specifically, the inorganic material may be suitable for interaction with the active component 304 through thermal processing. As used herein, such interaction between the inorganic material and the active component 304 may include any of various different forms of changes in the solid-state chemistry of the inorganic material at least partially resulting from thermally processing the inorganic material in the presence of the active component 304.

In certain implementations, the inorganic particles may include metallic particles. The metallic particles may be, for example, a single composition. As an additional or alternative example, however, the metallic particles may include a plurality of metal compositions in a predetermined ratio, such as may be useful for forming an alloy (e.g., according to an industry-standard specification). In some instances, the metallic particles may have a substantially uniform size distribution, which may facilitate substantially uniform spreading. In other instances, the metallic particles may have different sizes, such as may be useful for achieving a range of sintering temperatures based on the size distribution.

In some implementations in which the inorganic particles of the powder 104 include metallic particles, the interaction between the metallic particles of the powder 104 and the active component 304 may include alloying the metal of the metallic particles with the active component 304 during thermal processing. In such instances, variation of local concentration of the active component 304 relative to the metallic particles in the object 102 may facilitate forming a predetermined variation in alloy composition in the three-dimensional part formed by thermally processing the object 102. In turn, this variation in alloy composition may correspond to variations in one or more physicochemical properties of the three-dimensional part. Advantageously, the variations in physicochemical properties achievable through thermally processing the object 102 are numerous, given the ability to form the object 102 using a large number of combinations of materials. Examples of some useful variations in physicochemical properties achievable through such variation in alloy composition may include, but are not limited to, one or more of the following: corrosion resistance, melting point, hardening, thermal conductivity, electrical conductivity, or machinability. Some specific examples of alloys are described below to facilitate explanation of certain concepts, but these should not be considered limiting.

As an example, the metallic particles and the active component 304 may be alloyable with one another to form steel as the object 102 is thermally processed. Continuing with this example, the active component 304 may include any one or more of sulfur, phosphorus, antimony, fluorine, bismuth, arsenic, tin, lead, tellurium, chromium (e.g., in a chromate solution) manganese, or carbon, such as may be useful for achieving a gradient in one or more physicochemical properties associated with changes in concentrations of one or more of these materials in alloys of steel. That is, as a more specific example, one or more of concentration or composition of the active component 304 may be varied along the object 102 such that thermal processing of the object 102 may result in a three-dimensional part being stainless steel in certain regions (e.g., where corrosion resistance is a primary design consideration) and being tool steel in other regions (e.g., where wear resistance is a primary design consideration).

As an additional or alternative example, the metallic particles and the active component 304 may be alloyable to form an aluminum alloy. In certain instances, the active component 304 may include gallium, with areas of higher concentrations of gallium associated with an increase in weakness. By producing the object 102 with a variation in local concentration of gallium, the object 102 may be thermally processed to form a three-dimensional part having a predetermined gradient in weakness, which may be useful for forming the three-dimensional part with a preferential region of bending or failure. This may be useful, for example, in the fabrication of structural support members.

As further or alternative example, the metallic particles and the active component 304 may be alloyable to form a copper alloy. In certain instances, the active component 304 may include a variation in local concentration of one or more of bismuth, antimony, or tellurium, with this variation being useful for forming a desired gradient in one or more physicochemical properties in a three-dimensional part formed from thermally processing the object 102. As an example, in instances in which the active component 304 includes bismuth, the active component 304 may be selectively distributed such that the object 102 is thermally processable to form a three-dimensional part having desired regions of corrosion resistance. Antimony may be used in a similar manner to impart hardening to selected areas of a three-dimensional part formable through thermal processing of the object 102. Further or instead, tellurium may be used to impart machinability to predetermined areas of a three-dimensional part formable through thermal processing of the object 102.

In some instances, the metallic particles and the active component may be alloyable through thermal processing of the object 102 to form a free-machining material in specific regions of the three-dimensional part formed from the object 102. As used herein, free-machining shall be understood to refer to a material that forms small chips when machined. As compared to a material that does not form such small chips, a free-machining material is less likely to interfere (e.g., through unintended entanglement) with operation machinery and, thus, is generally considered to have improved machinability.

While the inorganic particles of the powder 104 have been described as including metallic particles, it should be appreciated that other compositions of inorganic particles are additionally or alternatively possible. For example, in certain applications, the inorganic particles of the powder 104 may include ceramic particles. Specific examples of ceramic particles that may be useful for formation of the object 102 include, but are not limited to, aluminum oxides or silicon carbide. In certain implementations, the ceramic particles may remain ceramic as the object 102 is thermally processed to form the three-dimensional part. However, in some implementations, the ceramic particles in the object 102 may be a metal oxide subjected to a reduction reaction to form a metal as the object 102 is thermally processed to form the three-dimensional part.

In general, the one or more target locations 306 of the active component 304 may be along any one or more portions of the object 102, which includes internal or otherwise inaccessible portions of the object 102. That is, the one or more target locations 306 of the active component 304 and, thus, the associated variations in physicochemical properties are generally not limited by external access afforded by geometry of the object 102. This is a significant advantage, as compared to techniques requiring introduction of one or more materials from a position external to an object.

In certain implementations, the one or more target locations 306 of the active component 304 may be at least partially within (e.g., away from at least one surface) the object 102. As a more specific example, the one or more target locations 306 of the active component 304 may be along internal channels, or other similar geometric features, defined by the object 102 and generally inaccessible from outside of the object 102. Continuing with this example, the one or more target locations 306 of the active component 304 along these internal channels may facilitate imparting wear-resistance, or another useful change in physicochemical properties, along these channels.

In some implementations, the one or more target locations 306 of the active component 304 may be at least partially along an outer surface of the object 102. Such positioning of the one or more target locations 306 of the active component 304 may be particularly useful for imparting changes in physicochemical properties in areas including intricate geometric features along the outer surface of the object 102. That is, as compared to the placement of material on intricate surface features of a part, the formation of the one or more target locations 306 of the active component 304 as part of the object 102 itself may offer more accurate control over a gradient of one or more physicochemical properties in the area of intricate detail.

Having described certain features of the object 102, attention is now turned to aspects of thermally processing the object 102 to form a three-dimensional part having a predetermined gradient of one or more physicochemical properties.

Figure 4:
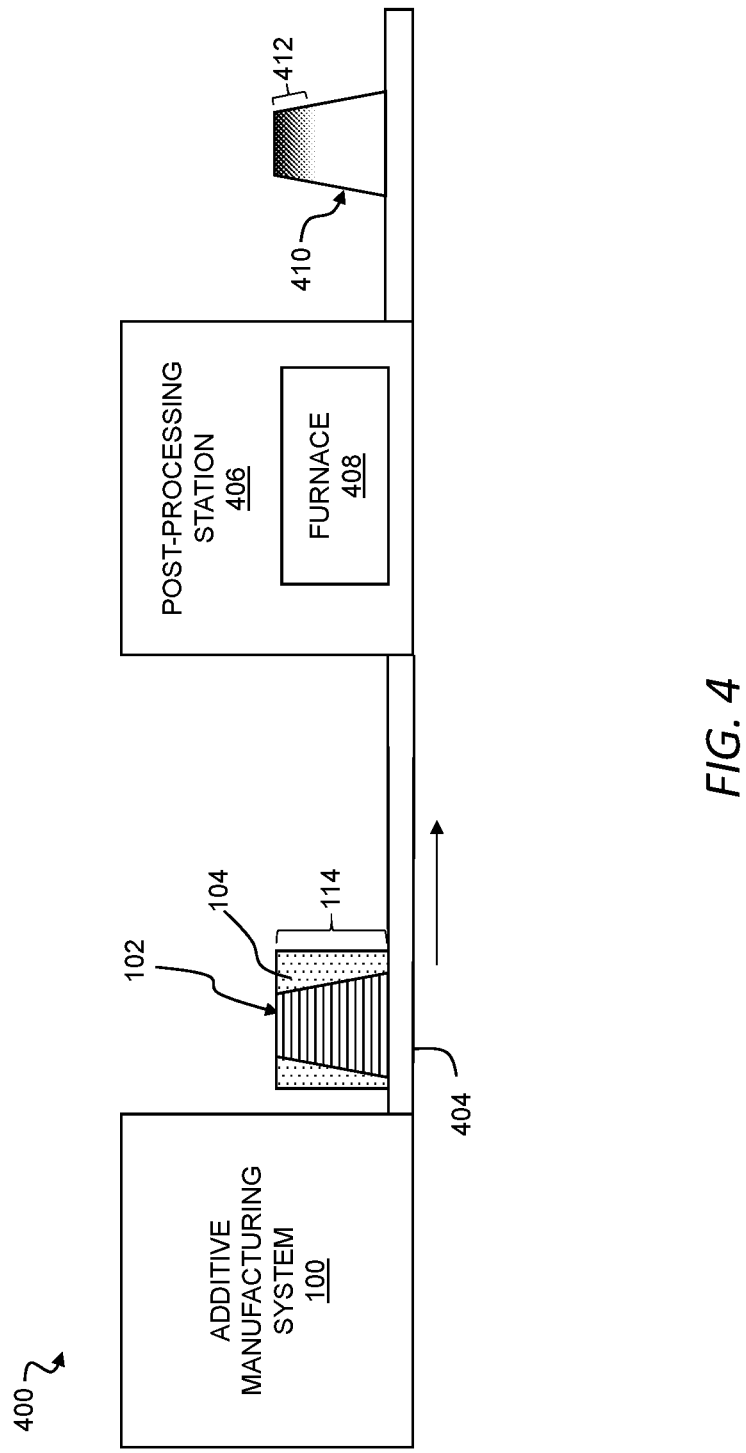
FIG. 4 is a schematic representation of an additive manufacturing plant including the additive manufacturing system of FIG. 1.

Referring now to FIGS. 1, 3 and 4, an additive manufacturing plant 400 may include the additive manufacturing system 100, a conveyor 404, and a post-processing station 406. The powder bed 114 containing the object 102 may be moved along the conveyor 404 and into the post-processing station 406. The conveyor 404 may be, for example, a belt conveyor movable in a direction from the additive manufacturing system 100 and toward the post-processing station 406. Additionally, or alternatively, the conveyor 404 may include a cart on which the powder bed 114 is mounted and, in certain instances, the powder bed 114 may be moved from the additive manufacturing system 100 to the post-processing station 406 through movement of the cart (e.g., through the use of actuators to move the cart along rails or by an operator pushing the cart). More generally, however, the conveyor 404 may be understood to include any manner and form of moving the object 102 to a post-processing station 406 for thermal processing the object 102 into a three-dimensional part 410 having a gradient 412 of one or more physicochemical properties.

In the post-processing station 406, the object 102 may be removed from the powder bed 114. The powder 104 remaining in the powder bed 114 upon removal of the object 102 may be, for example, recycled for use in subsequent fabrication of additional parts. Additionally, or alternatively, in the post-processing station 406, the object 102 may be cleaned (e.g., through the use of pressurized air) of excess amounts of the powder 104.

In certain instances, post-processing of the object 102 may include one or more debinding processes in the post-processing station 406 to remove all or a portion of the at least one binder 106 from the object 102. In general, it shall be understood that the nature of the one or more debinding processes may include any one or more debinding processes known in the art and may be a function of the constituent components of the at least one binder 106. Thus, as appropriate, the debinding may include, for example, one or more of a thermal debinding process, a supercritical fluid debinding process, a catalytic debinding process, or a solvent debinding process. For example, in instances in which the at least one binder 106 includes a binder system of more than one binder, a plurality of debinding processes may be staged to remove components of the binder system in corresponding stages as the object 102 is formed into the three-dimensional part 410 having the gradient 412 of the one or more physicochemical properties.

Additionally, or alternatively, the object 102 may undergo any one or more of various different types of thermal processing in the post-processing station 406. For example, the post-processing station 406 may include, a furnace 408 in which at least a portion of the thermal processing of the object 102 may be carried out to form the object 102 into the three-dimensional part 410 having the gradient 412 of one or more physicochemical properties. As an example, in the furnace 408, the object 102 may be subjected to a thermal process having a peak temperature of greater than about 500° C. and less than about 2100° C., with this temperature range being particularly useful for sintering metals or ceramics.

In general, thermally processing the object 102 forms the three-dimensional part 410 having, in at least an area of the three-dimensional part corresponding to a distribution of the active component 304 of the object 102, a gradient of one or more physicochemical properties of a material at least partially formed from thermally processing the inorganic particles of the powder 104 and the active component 304 of the object 102. In certain instances, the material may be formed from a reaction of the inorganic particles of the powder 104 and the active component 304. However, more generally, it should be appreciated that the inorganic particles of the powder 104 and the active component 304 may be adjacent (e.g., on a microscopic level) to one another in the object 102, and thermal processing the object 102 may produce an interaction between the inorganic particles and the active component 304. This interaction may include any of various different forms of changes in the solid-state chemistry of the inorganic material at least partially resulting from thermally processing the inorganic material in the presence of the active component 304. Thus, for example, the material may be formed from a reaction of the inorganic particles of the powder 104 and the active component 304 in the presence of a process gas used as part of the thermal processing of the object 102.

In certain instances, thermally processing the object 102 in the post-processing station 406 may densify the object 102 to form the three-dimensional part 410. That is, in this context, the object 102 should be understood to have a first density, and the three-dimensional part 410 should be understood to have a second density greater than the first density associated with the object 102. For certain applications, the second density may be at least 90 percent of a theoretical density of the material formed from thermally processing the inorganic particles and the active component.

Densification of the object 102 may include removal of the at least one binder 106 in one or more debinding processes. In such instances, it should be appreciated that, as compared to the at least one binder 106, the active component 304 may resist removal from the object 102 through the thermal processing. That is, the active component 304 may remain in the object 102 following the removal of the at least one binder 106, which may facilitate reacting the active component 304 with one or more of the inorganic particles of the powder 104 or a process gas used as part of the thermal processing.

Further or instead, densification of the object 102 may include reducing void space between the inorganic particles of the powder 104 in the object 102. This reduction in void space may be achieved, for example, through sintering the inorganic particles of the powder 104 to one another and/or to the active component 304. In certain implementations, the reduction in void space may be non-uniform throughout the object 102 to produce the gradient in one or more physicochemical properties sought to be achieved in the three-dimensional part 410.

In some instances, the object 102 may be sinterable to form the three-dimensional part 410, and thermally processing the object 102 may include any one or more sintering processes known in the art. That is, through the one or more sintering processes, the inorganic particles of the powder 104 may bond with one another and, optionally, with other substances to form at least a portion of the three-dimensional part formed from the object 102. Examples of such sintering processes include, but or not limited to, bulk sintering the inorganic particles in the solid state, liquid phase sintering, and transient liquid phase sintering.

In some implementations, the object 102 may be infiltratable with a liquid metal to form the three-dimensional part 410 and, therefore, thermally processing the object 102 may include infiltration of the liquid metal through the object 102. As a specific example, the inorganic particles of the powder 104 forming the object 102 may be pre-sintered or otherwise bound to form a substantially solid powdered preform. A liquid metal may be infiltrated into the substantially solid, powdered preform as part of the thermal processing to form a final part from the object 102.

In the sections that follow, various different methods useful for forming three-dimensional parts, such as the three-dimensional part 410 having the gradient 412, are described. In general, each of these methods may be carried out using the additive manufacturing plant 300. More specifically, unless otherwise specified or made clear from the context, each of the methods described in the sections that follow may be carried out using the additive manufacturing system 100 to form an object (e.g., the object 102) using binder jetting techniques (e.g., techniques described with respect to the exemplary method 200 in FIG. 2), and thermally processing the object in the post-processing station 406 to form a three-dimensional part having a gradient of one or more physicochemical properties. The gradient of the one or more physicochemical properties may be generally controlled through appropriate distribution of an active component in the object. In turn, thermally processing the object forms the three-dimensional part having the desired gradient of the one or more physicochemical properties. The methods described below are described separately for the sake of clarity of explanation and, unless a contrary intention is explicitly indicated or is made clear from the context, any of various different aspects of these methods may be used in combination with one another to form a three-dimensional part having a controlled gradient of one or more physicochemical properties.

Thermally Processable Active Component

Figure 5:
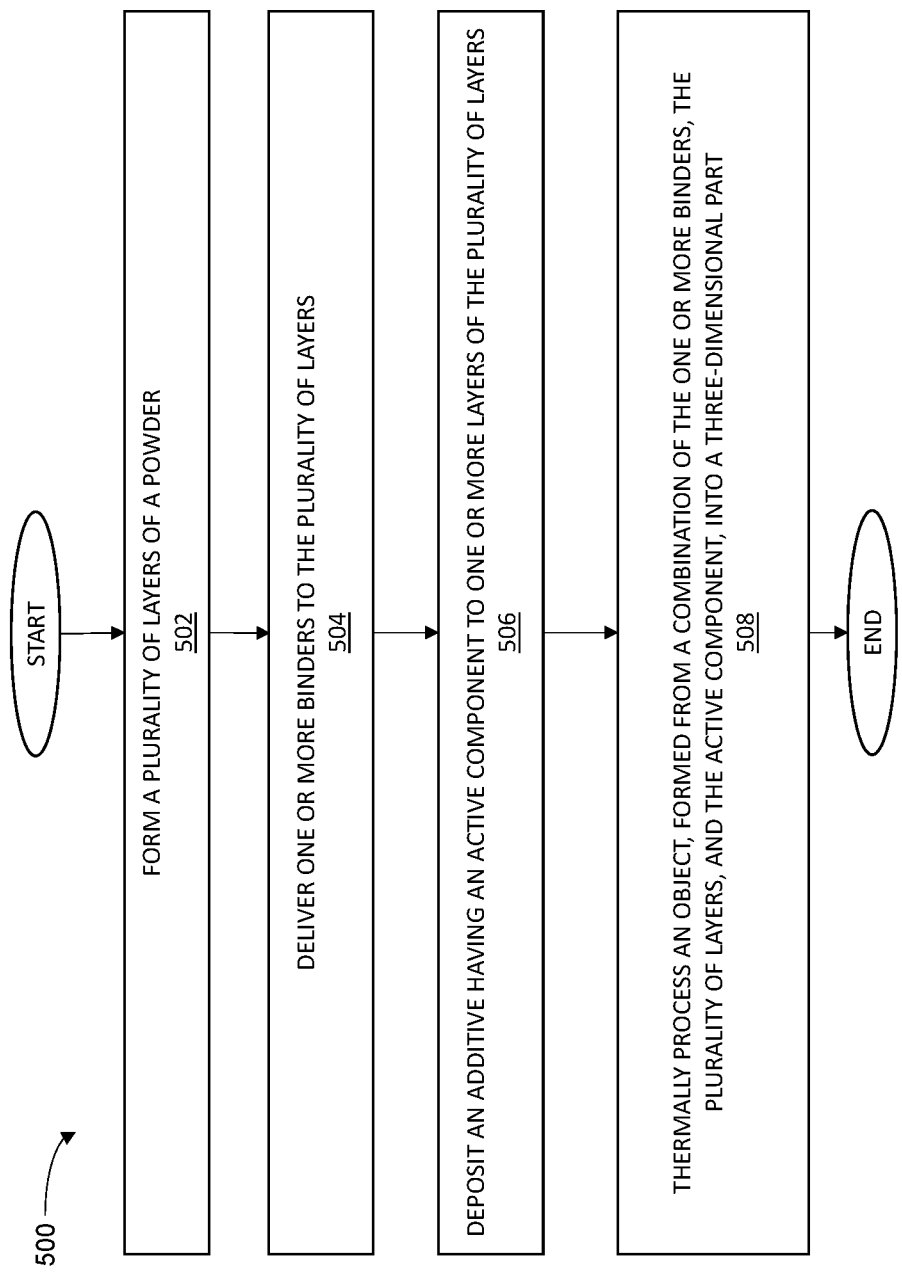
FIG. 5 is a flowchart of an exemplary method of using an active component to form a gradient of one or more physiochemical properties in a three-dimensional part.

FIG. 5 is a flowchart of an exemplary method 500 of using an active component to form a gradient of one or more physiochemical properties in a three-dimensional part. As described in greater detail below, the exemplary method 500 may facilitate accurate control of a gradient of one or more physicochemical properties of a three-dimensional part through accurate placement of an active component in an object that is thermally processable to form the three-dimensional part.

As shown in step 502, the exemplary method 500 may include forming a plurality of layers of a powder along a powder bed. These layers may be formed, for example, through spreading of each layer of the powder across the powder bed as part of a layer-by-layer process, such as described above with respect to the exemplary method 200 (FIG. 2), in which the layers are stacked on top of one another to form successive two-dimensional slices of an object being formed. Each of the layers may have a thickness of greater than about 30 microns and less than about 70 microns (e.g., about 50 microns). Further, or instead, the powder may include any one or more of the various different particles described herein and, thus, may include any manner and form of ceramic particles or metallic particles described herein.

As shown in step 504, the exemplary method 500 may include delivering one or more binders to the plurality of layers. For example, the one or more binders may be deposited to the plurality of layers of the powder between formation of successive layers of the plurality of layers of the powder. Additionally, or alternatively, depositing the one or more binders to the layer may include jetting the one or more binder to the plurality of layers. That is, continuing with this example, the one or more binders may be jetted to each layer of the plurality of layers from one or more nozzles of a printhead moving over each layer of the plurality of layers. More generally, depositing the one or more binders to the layer should be understood to include any of various different forms of delivery of binders described herein for depositing a binder to a layer in a controlled two-dimensional pattern associated with the given layer. Thus, delivering the one or more binders to the plurality of layers may include the use of one or more of piezoelectric jetting, thermal jetting, pneumatic jetting, magnetohydrodynamic jetting, electrohydrodynamic jetting, or acoustophoretic jetting. The applicability of such delivery techniques should be understood to be at least partially determined by the one or more binders to be delivered. More specifically, the one or more binders may include at least one of a polymer (e.g., one or more of poly(acrylic acid), a latex suspension, or poly (vinyl alcohol)), a salt, nanoparticles, or a gel, and the suitability of a particular delivery technique should be generally understood to be based at least partially based on one or more physical or chemical characteristics of each of these forms of the one or more binders.

In general, each binder of the one or more binders may be delivered to one or more layers of the plurality of layers in a respective controlled two-dimensional pattern based on the respective binder and a given layer. As used herein, a controlled two-dimensional pattern shall be generally understood to include a two-dimensional geometric pattern and, in some instances, a variation in local concentration along the geometric pattern. For example, the controlled two-dimensional patterns of the one or more binders in a given layer may be formed to achieve a predetermined shape, local concentration, or a combination thereof, of a particular binder in the given layer. Further, or instead, the controlled two-dimensional patterns of the one or more binders in the given layer may be formed to achieve a predetermined overlap with one another to achieve a predetermined pattern of local formulations of binder in the given layer.

As shown in step 506, the exemplary method 500 may include depositing an additive to the one or more layers of the plurality of layers. In general, the additive may include an active component, and an object may be formed by a combination of at least the one or more binders, the plurality of layers of the powder, and the active component. It should be understood that other materials may also be present in the object, such as in instances in which the additive includes a carrier in which the active component is dispersed. For the sake of clarity of explanation, the exemplary method 500 is described with respect to deposition of a single additive. However, unless otherwise specified or made clear from the context, it should be generally understood that any number of additives may be distributed to the one or more layers of the plurality of layers to produce material distributions useful for forming any manner and form of gradients of physicochemical properties in three-dimensional parts formed from thermally processing the object.

The additive may include an active component in a higher volumetric concentration in the additive than in each of the one or more binders. That is, the additive may have the same constituent components as one or more of the binders, provided that a volumetric concentration of the active component in the additive is greater than a volumetric concentration of the active component in the binder. This is the case, for example, in instances in which the additive and one or more of the binders are identical, except that the additive includes an active component and the one or more binders do not include the active component. Stated differently, as compared to the one or more binders individually, the additive may facilitate more efficient delivery of the active component to a given layer.

The additive may be deposited to the one or more layers of the plurality of layers according to any one or more techniques described herein as being useful for controlled delivery of a material (e.g., the one or more binders) in a controlled two-dimensional pattern along the one or more layers. Thus, like the one or more binders, the additive may be jetted to the one or more of the layers from a nozzle associated with a printhead moving over the one or more layers. More generally, however, the additive may be jetted to the one or more layers according to any one or more of various different techniques described herein and compatible with the physical and chemical properties of the additive.

In some implementations, the additive may be deposited to the one or more layers of the plurality of layers according to a controlled two-dimensional pattern suitable for achieving a predetermined spatial distribution of the active component in the object being formed. This controlled two-dimensional pattern associated with the additive may be substantially Thus, in certain implementations, the additive may at partially overlap all or a portion of the one or more binders in at least one of the layers of the plurality of layers. Further, concentration of the active component may be varied along the overlap, which may be useful for providing an additional degree of control over the gradient of physicochemical properties of the three-dimensional part formed from thermally processing the object.

The additive may be deposited to the one or more layers of the plurality of layers separately from delivery of the one or more binders to the plurality of layers. Such separate delivery of the additive and the one or more binders may be useful, for example, for achieving a high degree of flexibility in combinations of the one or more binders with the active component of the additive in a given layer. As a specific example, the one or more binders may be delivered to the plurality of layers from a first printhead, and the additive may be deposited to one or more layers from a second printhead, separately controllable with respect to control of the first printhead.

In some instances, the additive may include a binder. In such instances, because the additive itself may act as a binder, the additive may be segregated from the one or more binders in a given layer. In this context, segregation of the additive from the one or more binders in the given layer should be understood to include a distribution in which the additive and the one or more binders are non-overlapping but adjacent to one another in the given layer. While such segregation may be useful in some applications, it should be understood the additive may be combined with the one or more binders, as may be necessary or useful for particular applications. Additionally, or alternatively, a binder included in the additive to be selectively deposited to one or more layers may be different from the one or more binders delivered to the plurality of layers. Further, or instead, at least one of the first binder and the second binder may include one or more of poly(acrylic acid), a latex suspension, or poly(vinyl alcohol).

In general, composition of the active component included in the additive may be based at least upon the composition of the inorganic particles of the powder and the one or more physicochemical properties to be varied within the three-dimensional part ultimately formed from the object being fabricated through binder jetting. Thus, in some instances, the active component may include one or more interstitial elements of at least one phase of the three-dimensional part. In this context, the term "phase" is used in the metallurgical sense and, thus, should be understood to be part of the three-dimensional object having a uniform chemical composition and physical characteristics (e.g., state of matter and crystal structure). As an example, in instances in which the three-dimensional part includes a ferrous phase and/or a nickel phase, the active component may include one or more of the following interstitial elements: carbon, sulfur, nitrogen, hydrogen, boron, phosphorous, oxygen, or silicon. As another example, in instances in which the three-dimensional object includes an aluminum phase, the active component may include one or more of the following interstitial elements: nitrogen, oxygen, or hydrogen. As yet another example, in instances in which the three-dimensional part includes a titanium phase, the active component may include one or more of the following interstitial elements: nitrogen, oxygen, hydrogen, iron, nickel, cobalt, chromium, manganese, hydrogen, or oxygen. As still another example, in instances in which the three-dimensional part includes a copper phase, the active component may include one or more of the following interstitial elements: carbon, sulfur, nitrogen, boron, phosphorous, oxygen, or silicon. Other types of active components may additionally or alternatively include one or more of tungsten or molybdenum.

While the active component may include a single material in certain instances, it should be appreciated that the active component may, further or instead, include a plurality of materials. An active component including a plurality of materials may be useful, for example, for facilitating local formation of a particular material in a three-dimensional part. Thus, returning to the example of steel, the active component may include certain components of stainless steel such that selective deposition of the active component may result in local formation of stainless steel in predetermined portions of the three-dimensional part.

In general, given that the active component of the additive may be any of various different materials useful for imparting a desired gradient of physicochemical properties, it should be appreciated that the active component may be in any one or more of various different physical forms. To facilitate delivery of certain forms of the active component, the additive may include a carrier in which the active component is disposed. In this context, a carrier may include any medium in which the active component may be stably dispersed and which is amenable to accurate delivery using any one or more of the delivery techniques described herein. Thus, for example, the carrier may facilitate delivery (e.g., jetting) of the active component from a printhead as described herein.

In certain implementations, the active component may be undissolved in the carrier, which may be useful for working with certain material compositions of the active component. For example, certain material compositions may be ubiquitously available and, thus particularly useful, in particle form. Accordingly, in some instances, the active component may include particles stably suspended in the carrier. Unless otherwise indicated or made clear from the context, such stably suspended particles may have any of various different compositions described herein and, thus, may be any one or more of various different metals introducible into the object to produce a desired gradient of one or more physicochemical properties in a three-dimensional part formed from the object. Thus, by way of example, the stably suspended particles may be one or more of iron or chromium, which may be useful for, among other things, imparting a gradient of one or more physicochemical properties in a three-dimensional part formed of steel. In some instances, the particles of the active component may differ in composition from the inorganic particles of the powder, which may be useful for imparting gradients in certain physicochemical properties associated with changes in local composition, rather than local concentration, of material.

In some implementations, the particles of the active component may be hydrophobic (e.g., carbon particles) and the carrier may include water and at least one surfactant (e.g., one or more of an anionic surfactant, a cationic surfactant, a zwitterionic surfactant, or a non-ionic surfactant) such that the particles of the active component may remain stably suspended in water at least for a period of time suitable for a binder jetting fabrication process used to form the object.

In some instances, the particles of the active component stably suspended in the carrier may have a controlled size distribution (e.g., a size distribution ranging from greater than about 1 nm to less than about 5000 nm). As an advantage, such a controlled size distribution may reduce the likelihood of damage to hardware components (e.g., a printhead) used to deliver the additive including the particles of the active component. Further, or instead, the controlled size distribution of the particles of the active component may facilitate accurately varying local concentrations of the active component along the object being fabricated.

While the active component has been described as being undissolved in a carrier, other approaches to carrying the active component in a carrier are additionally or alternatively possible. For example, the carrier may include a solvent, and the active component may be dissolved in the solvent, which may accurate more accurate metering of the active component as compared to instances in which the active component is suspended in a carrier. It should be generally understood that the nature of the carrier as a solvent in this context depends on the composition of the carrier and active component and, more specifically, whether the active component is soluble in the carrier. Examples of solvents suitable for dissolving active components may include one or more of water, an aromatic organic substance, an aliphatic organic substance (e.g., an alcohol). Further, or instead, the solvent may include a surfactant.

As shown in step 508, the exemplary method 500 may include thermally processing the object into a three-dimensional part. Given that the three-dimensional part is formed from thermally processing the object, it should be generally understood that locations on the object correspond (e.g., in a one-to-one mapping) to locations on the three-dimensional part in a known manner, even though the three-dimensional part may be smaller than the object due to shrinking in certain instances. Accordingly, through thermally processing the object into the three-dimensional part, the three-dimensional part may have, in at least an area of the three-dimensional part corresponding to a distribution of the active component of the object, a gradient of one or more physicochemical properties of a material at least partially formed from thermally processing the inorganic particles and the active component of the object.

The gradient of the one or more physicochemical properties may have any one or more of the variations different spatial variations (e.g., varying according to a continuous function or varying according to a step change) described herein and may be along any one or more portions of the three-dimensional part. By way of example, the gradient of the one or more physicochemical properties may include formation of a three-dimensional part having different physicochemical properties on different faces of the three-dimensional part (e.g., corrosion resistance on one face of the three-dimensional part and high hardness on another face of the three-dimensional part). As another example, the gradient of the one or more physicochemical properties may be in the form of wear-resistant channels defined by the three-dimensional part. More generally, the gradient of the one or more physicochemical properties may be of any direction and nature along the three-dimensional part as may be useful for achieving specific design criteria, which may be, for example, a function of one or more of geometry or end use of the three-dimensional part.

In some implementations, at least a portion of the gradient of the one or more physicochemical properties of the material may be along a surface of the three-dimensional part. For example, at least a portion of the gradient of the one or more physicochemical properties of the material may be perpendicular to the surface of the three-dimensional part (e.g., such that the gradient extends from the surface of the three-dimensional part in a direction into an interior portion of the three-dimensional part). In instances in which the surface of the three-dimensional part is curved, the gradient of the one or more physicochemical properties of the material may be perpendicular to a plane tangential to the curved surface of the three-dimensional part. Further, or instead, at least a portion of the gradient of the one or more physicochemical properties may be parallel to the surface of the three-dimensional part.

In certain implementations, at least a portion of the gradient of the one or more physicochemical properties of the material may be within the three-dimensional part, away from surfaces of the three-dimensional part. Such positioning of at least a portion of the gradient within the three-dimensional part is a significant advantage of the techniques of the present disclosure, as compared to modification approaches based on external access to a part. Thus, for example, the gradient of the one or more physicochemical properties may be formed entirely within the three-dimensional part and/or may extend to geometric details that are inaccessible or difficult to access from an external surface of the three-dimensional part.

In general, the material having the gradient of the one or more physicochemical properties in the three-dimensional part may be formed from any manner and form of direct or indirect interaction described herein between the inorganic particles and the active component during thermal processing. That is, the inorganic particles and the active component may be adjacent to one another (e.g., on a microscopic level) in the object as the object is thermally processed, such that the presence of the active component influences a change in the inorganic particles during thermal processing. As an example, the material having the gradient may be formed by chemically reacting at least the inorganic particles and the active component with one another during thermal processing carried out to form the object into the three-dimensional part. Further, or instead, the material having the gradient may be at formed through a process including chemically reacting the inorganic particles or the active component with one or more process gases used in thermally processing the object to form the three-dimensional part.

In general, thermally processing the object may include any manner and form of exposure of the object to elevated temperature suitable to form the object into the three-dimensional part including the material having the gradient of physicochemical properties. Examples of thermal processing, therefore, include any manner and form of sintering the object or infiltrating the object with a liquid metal. Elevated temperatures associated with the thermal processing may be based on the inorganic particles and the active component used to form the material. The lower end of a peak temperature range for a given combination of the inorganic particles and the active component may be based on achieving suitable sintering or requirements associated with achieving suitable infiltration of an infiltrant (e.g., a liquid metal). The upper end of this peak temperature range may be based on retaining useful material properties of the material formed at least partially from the inorganic particles and the active component. For instances in which the material having the gradient is formed from metals and/or ceramics, thermally processing the object may include exposing the inorganic particles and the active component to a peak temperature of greater than about 500° C. and less than about 2100° C.

Thermally processing the object may include densifying the object into the three-dimensional part. That is, the object may have a first density prior to thermal processing, the three-dimensional part may have a second density after thermal processing, and the second density may be greater than the first density. While the amount of densification may depend on particular use cases, the second density may advantageously be at least 90 percent of a theoretical density of the material formed from thermally processing the inorganic particles and the active component.

While thermal processing of the object to form the three-dimensional part may result in densification in certain instances, it should be understood that thermal processing may further or instead result in other salient differences between the object and the three-dimensional part. That is, in some instances, the three-dimensional part may remain porous, with the thermal processing produces other differences in properties between the object and the three-dimensional part. For example, thermal processing may increase resistance to tension, which may be useful for maintaining the shape of the three-dimensional part through subsequent processing. That is, the object may have a first resistance to tension along a direction, the three-dimensional part may have a second resistance to tension along the direction, and the second resistance to tension may be greater than the first resistance to tension along the direction. Further, or instead, the object may have a first thermal conductivity and the three-dimensional part may have a second thermal conductivity greater than the first conductivity. Still further or instead, the object may have a first electrical conductivity and the three-dimensional part may have a second electrical conductivity greater than the first conductivity.

The material at least partially formed from thermally processing the inorganic particles and the active component may be any one or more of the various different materials described herein as being formable through thermally processing the inorganic particles and the active component. Thus, for example, this material may be any one or more of various different alloys described herein. In some instances, the alloy may be steel, with the active component including any one or more of various different materials useful for changing properties of steel (e.g., one or more of carbon, boron, sulfur, phosphorus, antimony, fluorine, bismuth, arsenic, tin, lead, tellurium, or manganese). In certain instances, the alloy may be an aluminum alloy, and the active component of the additive may include gallium. In some instances, the alloy may be a copper alloy, and the active component may include one or more of bismuth, antimony, tellurium, zirconium, or chromium. In some instances, the alloy may be a free-machining material. As an additional or alternative example, the material at least partially formed from thermally processing the inorganic particles and the active component of the object may be a matrix material. Continuing with this example, the active component may be unreacted in the matrix material.

Salt as an Active Component

Figure 6:
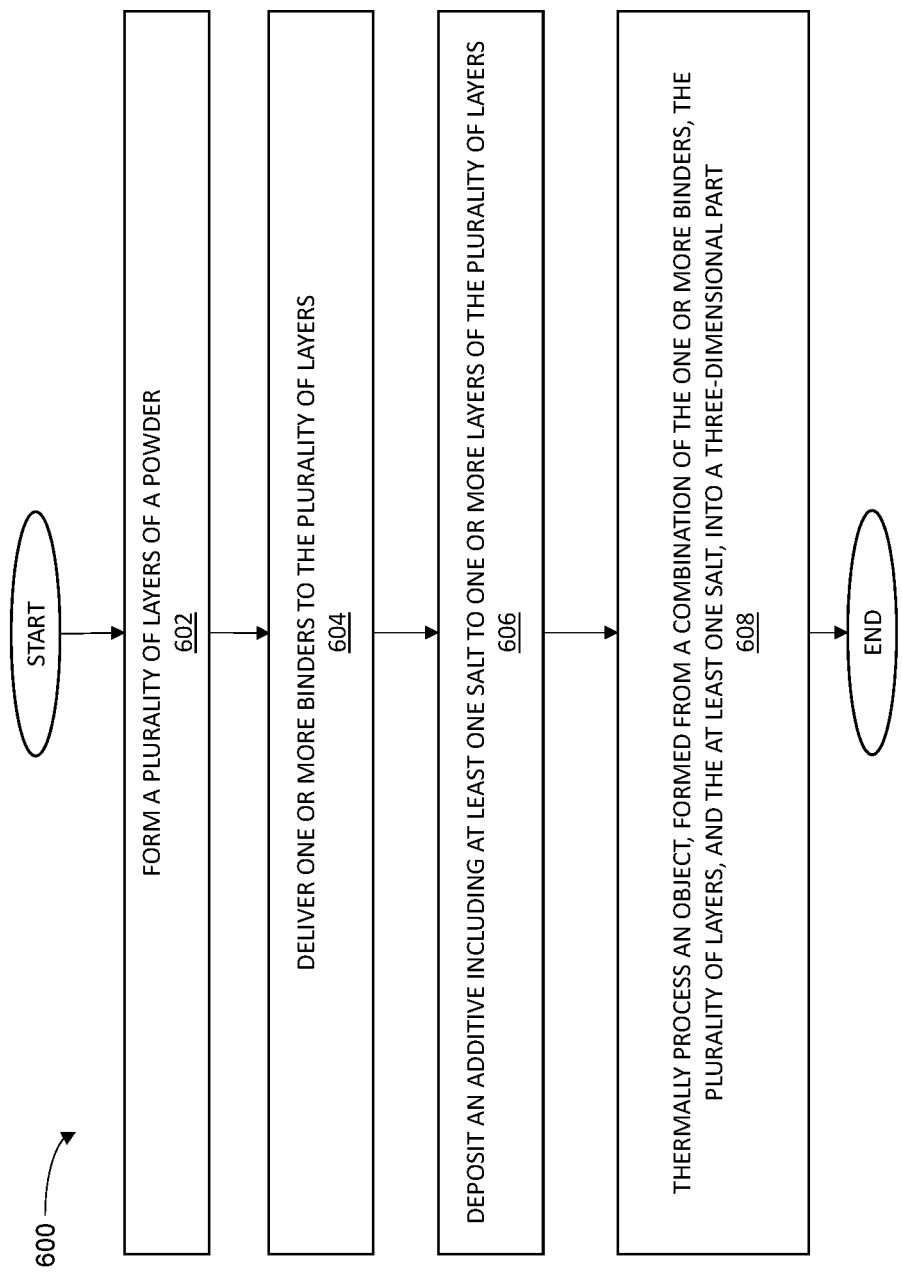
FIG. 6 is a flowchart of an exemplary method of using a salt as an active component to form a gradient of one or more physiochemical properties in a three-dimensional part.

FIG. 6 is a flowchart of an exemplary method 600 of using a salt as an active component to form a gradient of one or more physicochemical properties in a three-dimensional part. As described in greater detail below, the exemplary method 600 may facilitate forming a gradient of one or more physicochemical properties of a three-dimensional part through the use of a stable additive that is thermally processable to form the three-dimensional part. Unless otherwise specified or made clear from the context, it should be generally understood that the exemplary method 600 may include one or more aspects of the exemplary method 500 (FIG. 5) described above and, for the sake of clarity and efficient description, these aspects are not repeated below with respect to the exemplary method 600, except to highlight differences or to elaborate on certain features.

As shown in step 602, the exemplary method 600 may include forming a plurality of layers of a powder along a powder bed. In general, step 602 may be analogous to step 502 (FIG. 5) described above.

As shown in step 604, the exemplary method 600 may include delivering one or more binders to the plurality of layers. In general, step 604 may be analogous to step 504 (FIG. 5) described above.

As shown in step 606, the exemplary method 600 may include depositing an additive to one or more layers of the plurality of layers. The additive may include at least one salt. An object may be formed from a combination of materials including at least the one or more binders, the plurality of layers, and the at least one salt. As compared to other forms of introducing an active component into an object being formed through a binder jetting technique, the use of a salt may be particularly useful at least because salts may be stable over long periods of time and through conditions associated with shipping and storage. That is, the use of a salt may provide a robust solution to the challenge of introducing an active component into an object for thermal processing, as described herein, to form a material having a gradient of one or more physicochemical properties.

In certain implementations, the additive may include a solvent, and the at least one salt may be dissolved in the solvent. In certain instances, the solvent may be water, which may be particularly useful for forming the additive at the point of fabrication of the object. This has the advantage of reducing storage requirements associated with the additive.

In some implementations, the at least one salt may be a metal-containing salt (e.g., a boron-containing salt, a tungsten-containing salt such as any one or more of ammonium paratungstate and ammonium heptamolybdate, or a molybdenum-containing salt such as any one or more of ammonium orthomolybdate, ammonium heptamolybdate, ammonium phosphomolybdate, and ammonium tetrathiomolybdate). Through thermal processing or another reaction taking place in the object, metal derived from the metal-containing salt may at least partially form the material having the gradient of physicochemical properties in the three-dimensional part. For example, in instances in which the inorganic particles of the powder include metallic particles, the material at least partially formed from the inorganic particles and the at least one salt is an alloy at least partially formed from the metallic particles and the metal of the metal-containing salt.

As shown in step 608, the exemplary method 600 may include thermally processing the object into a three-dimensional part having, at least an area of the three-dimensional part corresponding to a distribution of the at least one salt of the object, a gradient of one or more physicochemical properties of a material at least partially formed from the inorganic particles and the at least one salt through thermal processing of the object. In general, thermally processing the object may include carrying out any one or more of various different thermal processes described herein (including sintering and/or infiltrating the object with a liquid metal) at elevated temperature to form the object into the three-dimensional part.

In general, the gradient of the three-dimensional part formed according to the exemplary method 600 may have any one or more characteristics of the various different gradients described herein. Thus, for example, along a first portion of the gradient, the three-dimensional part may be stainless steel, and along a second portion of the gradient different from the first portion of the gradient, the alloy may be tool steel. That is, in such implementations, the exemplary method 600 may be used to form a part having corrosion resistance along a portion of the three-dimensional object likely to encounter corroding agents and having wear resistance along a portion of the three-dimensional object likely to be subjected to wear.

Sterically Stabilized Active Component

Figure 7:
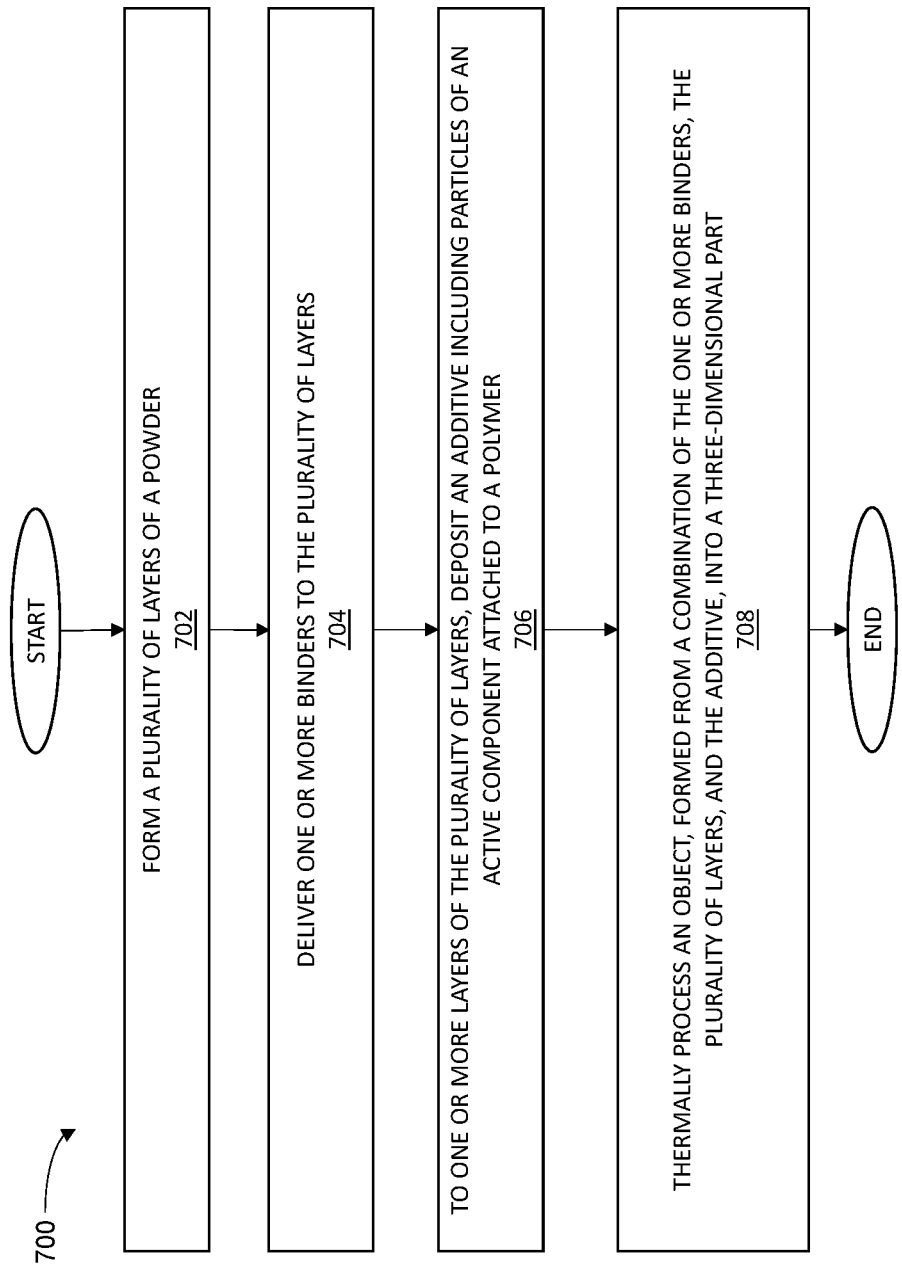
FIG. 7 is a flowchart of an exemplary method of additive manufacturing of a three-dimensional part using a stable additive including particles of an active component.

FIG. 7 is a flowchart of an exemplary method 700 of additive manufacturing of a three-dimensional part using a stable additive including particles of an active component. Unless otherwise specified or made clear from the context, it should be generally understood that the exemplary method 700 may include one or more aspects of the exemplary method 500 (FIG. 5) or the exemplary method 600 (FIG. 6) described above and, for the sake of clarity and efficient description, these aspects are not repeated below with respect to the exemplary method 700, except to highlight differences or to elaborate on certain features.

As shown in step 702, the exemplary method 700 may include forming a plurality of layers of a powder along a powder bed. In general, step 702 may be analogous to step 502 (FIG. 5) described above.

As shown in step 704, the exemplary method 700 may include delivering one or more binders to the plurality of layers. In general, step 704 may be analogous to step 504 (FIG. 5) described above.

As shown in step 706, the exemplary method 700 may include depositing an additive to one or more layers of the plurality of layers such that an object is formed from a combination of at least the one or more binders, the plurality of layers, and the additive. The additive may include a first polymer and particles of an active component attached to the first polymer such that the particles of the active component are sterically stabilized in the additive. In certain implementations, it may be desirable, or even necessary, to deliver an active component in the form of particles, rather than in another form (e.g., a salt) that may exhibit inherent stability. This may be the case, for example, in instances in which a particular size distribution or average size of particles is desirable. As such, the additive including particles of an active component attached to the first polymer addresses the challenge of delivering particles of a particular size distribution or average size while maintaining those particles in a stable form with a shelf-life suitable for transportation and storage in commercial applications.

In certain implementations, a volumetric concentration of the particles of the active component may be higher in the additive than in the one or more binders. For example, the one or more binders may be free of the particles of the active component such that the additive is the only source of the particles. Further, or instead, the one or more binders may include a second polymer, which may be different from the first polymer in some cases. For example, the first polymer may be formed of a material particularly suitable for attachment to the particles of the active component while the second polymer may be formed of a material particularly suited to holding the inorganic particles together in a given layer of the plurality of layers. In certain implementations, one or both of the first polymer and the second polymer may be poly(ethylene glycol). Additionally, or alternatively, the one or more binders may include at least one of a salt, nanoparticles, or a gel.

The first polymer may be attached to the particles of the active component in any manner suitable for achieving steric stabilization of the additive. Thus, for example, the first polymer may be covalently grafted to the surfaces of the particles of the active component. Further, or instead, the first polymer may be physically adsorbed to surfaces of the particles of the active component. Such physical adsorption may be, for example, ionic.

In general, it should be appreciated that the particles of the active component and the polymer are formed of materials that are attachable to one another through surface chemistry on the surfaces of the particles. In some instances, therefore, the particles of the active component may be silicon-based and include a silicon dioxide surface group. Further, or instead, the particles of the active component may have a metal oxide surface chemistry. Still further, or instead, surfaces of the particles of the active component may include an oxide coating, and the first polymer may be silane-terminated. As yet another, non-exclusive example, the first polymer may be thiol-terminated, and the particles of the active component may have a surface group of at least one of gold, platinum, silver, silicon, and silicon dioxide. As an additional or alternative example, the first polymer may be carboxyl-terminated, and the particles of the active component have a surface group of at least one of gold, silver, silver oxide, aluminum oxide, silicon, silicon dioxide, copper, and a copper oxide.

As shown in step 708, the exemplary method 700 may include thermally processing the object into a three-dimensional part having in at least an area of the three-dimensional part corresponding to a distribution of the particles of the active component of the object, a gradient of one or more physicochemical properties of a material at least partially formed from thermally processing the inorganic particles and the active component of the object. Such thermal processing may be carried out according to any one or more of various different techniques described herein and, thus, may include one or more of sintering the object or infiltrating the object with a liquid metal. In certain instances, thermally processing the object according to any one or more of the techniques described herein may separate the particles of the active component from the first polymer, which may be useful for facilitating interaction between the inorganic particles and the particles of the active component as part of thermal processing to form the material having a gradient of the one or more physicochemical properties in the three-dimensional part.

Decomposing a Binder to Form an Active Component

Figure 8:
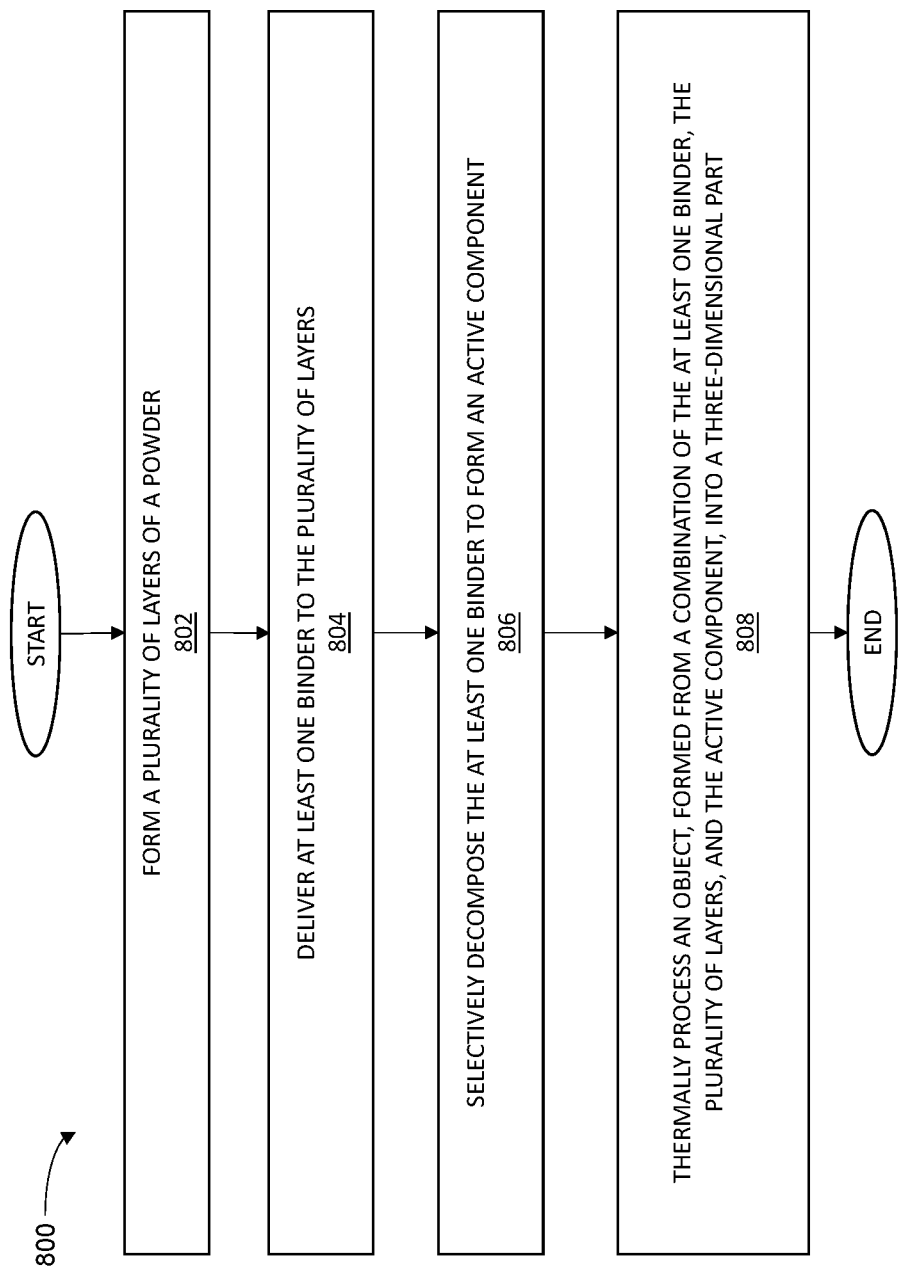
FIG. 8 is a flowchart of an exemplary method of additive manufacturing based on selective decomposition of at least one binder to form an active component.

FIG. 8 is a flowchart of an exemplary method 800 of additive manufacturing based on selective decomposition of at least one binder to form an active component. Unless otherwise specified or made clear from the context, it should be generally understood that the exemplary method 800 may include one or more aspects of the exemplary method 500 (FIG. 5), the exemplary method 600 (FIG. 6), or the exemplary method 700 (FIG. 7) described above and, for the sake of clarity and efficient description, these aspects are not repeated below with respect to the exemplary method 800, except to highlight differences or to elaborate on certain features.

As shown in step 802, the exemplary method 800 may include forming a plurality of layers of a powder across a powder bed. In general, step 802 may be analogous to step 502 (FIG. 5) described above.

As shown in step 804, the exemplary method 800 may include delivering at least one binder to the plurality of layers of the powder. In general, step 804 may be analogous to step 504 (FIG. 5) described above.

As shown in step 806, the exemplary method 800 may include selectively decomposing the at least one binder to form an active component. In general, such selective decomposition of the at least one binder to form the active component may facilitate forming the active component in situ, which may offer significant advantages in terms of simplicity with respect to simplification of the process used to form a three-dimensional part having a gradient of one or more physicochemical properties. For example, by forming the active component in situ, the exemplary method 800 may be less prone to challenges associated with maintaining stability of additives including the active component. Further or instead, forming the active component in situ may facilitate the use of lower cost materials to deliver the active component to target locations within the object.

In general, the active component may be any one or more materials formable from decomposition of the at least one binder. For example, the active component yielded from selective decomposition of the at least one binder may include carbon. That is, selective decomposition of the at least one binder to form the active component may increase a local concentration of carbon in the object. Such an increase in local concentration of carbon may be useful for imparting a gradient of one or more physicochemical properties in certain instances, such as in the formation of a steel part having a gradient in one or more physicochemical properties. Further, or instead, selective decomposition of the at least one binder may form a second component, in addition to or as an alternative to the formation of carbon. As an additional or alternative example, the at least one binder may include an oxygen containing material such that decomposition of that at least one binder in the presence of aluminum or titanium creates areas of relative weakness as compared to regions of the object along which the oxygen-containing material is not decomposed. Such engineered weakness may be useful, for examples, in implementations in which an area of reduced strength of the three-dimensional part is desirable, such as shear pins or bolts.

The active component formed from selective decomposition of the at least one binder may be formed from any one or more different decomposition mechanisms, with the suitability of a given decomposition mechanism based at least in part on a combination of a chemical composition of the at least one binder and a chemical composition of the active component yielded from the at least one binder. Thus, for example, the at least one binder may include a salt and decomposing at least a portion of the at least one binder may include selectively decomposing a portion of the salt (e.g., through local thermal decomposition of the salt) such the decomposed portion of the salt forms the active component in certain target areas along the one or more layers and, thus, in the object formed from the one or more layers. Continuing with this example, the portion of the salt that is not decomposed may remain as a binder in the one or more layers and, thus, in the object formed from the one or more layers. Further, or instead, the at least one binder may include a polymer, and decomposing at least a portion of the at least one binder may include thermal pyrolysis of the polymer in certain target locations of the object.

As shown in step 808, the exemplary method 800 may include thermally processing the object into a three-dimensional part having, in at least an area of the three-dimensional part corresponding to the active component of the object, a gradient of one or more physicochemical properties of a material at least partially formed from thermally processing the inorganic particles and the active component of the object. In general, thermally processing the object into the three-dimensional part may be carried out using any one or more of the various different thermal processing techniques described herein and, therefore, may include sintering the object, infiltrating the object with an infiltrant (e.g., a liquid metal), or a combination thereof.

In certain implementations, thermally processing the object according to step 808 may be carried out separately from one or more techniques used to selectively decompose the at least one binder according to step 806. That is, thermally processing the object according to step 808 may be a global process carried out on the entire object, whereas selective decomposing the at least one binder according to step 806 may be carried out locally, at target locations in one or more layers as the object is being formed in a layer-by-layer binder jetting process.

Chemically Modifying a Binder to Form an Active Component

Figure 9:
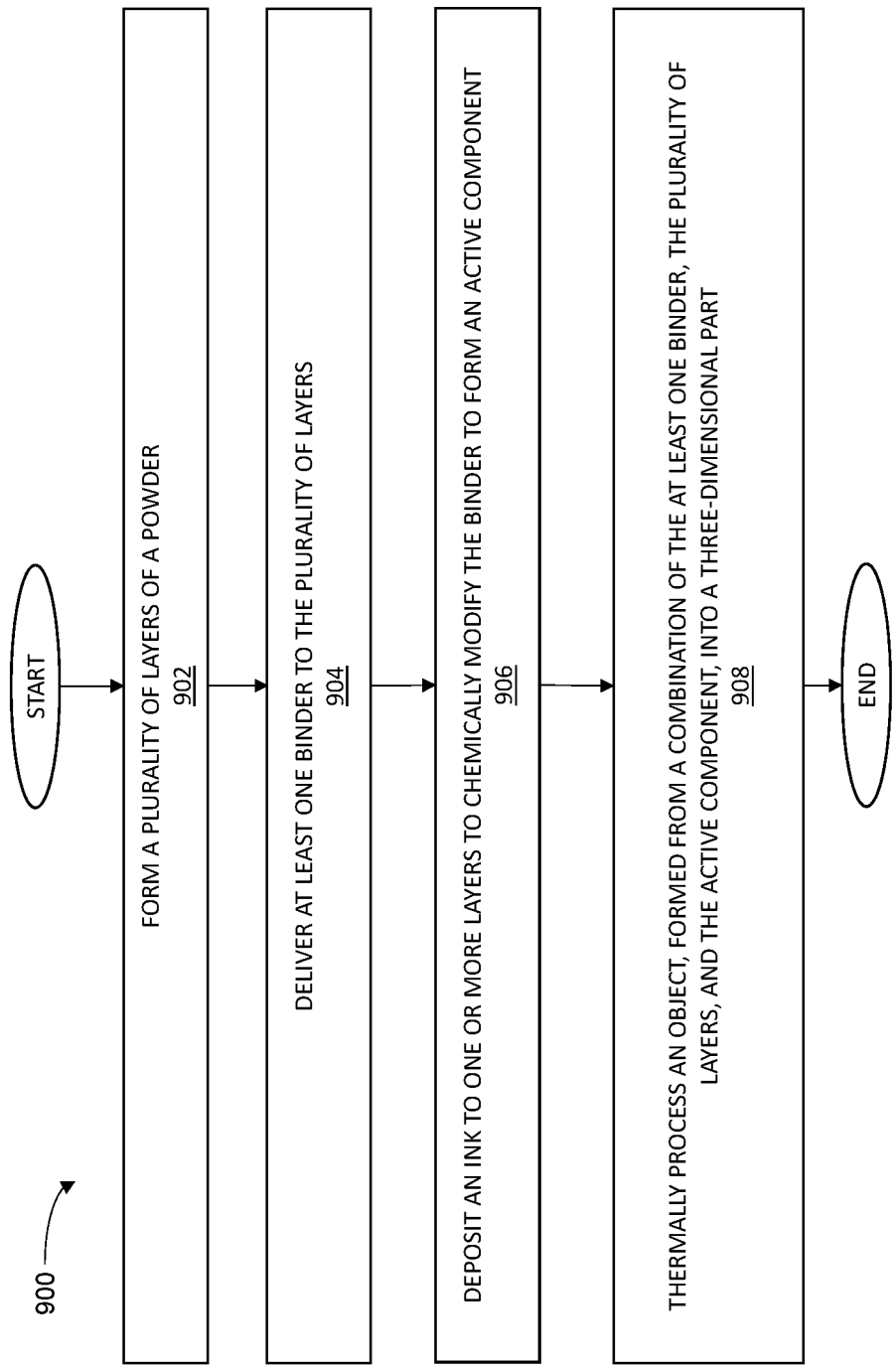
FIG. 9 is a flowchart of an exemplary method of additive manufacturing based on selective chemical modification of at least one binder to form an active component.

FIG. 9 is a flowchart of an exemplary method 900 of additive manufacturing based on selective chemical modification of at least one binder to form an active component. Unless otherwise specified or made clear from the context, it should be generally understood that the exemplary method 900 may include one or more aspects of the exemplary method 500 (FIG. 5), the exemplary method 600 (FIG. 6), the exemplary method 700 (FIG. 7), or the exemplary method 800 (FIG. 8) described above and, for the sake of clarity and efficient description, these aspects are not repeated below with respect to the exemplary method 900, except to highlight differences or to elaborate on certain features.

As shown in step 902, the exemplary method 900 may include forming a plurality of layers of a powder across a powder bed. In general, step 902 may be analogous to step 502 (FIG. 5) described above.

As shown in step 904, the exemplary method 900 may include delivering at least one binder to the plurality of layers of the powder. In general, step 904 may be analogous to step 504 (FIG. 5) described above.

As shown in step 906, the exemplary method 900 may include depositing an ink to one or more layers of the plurality of layers. The ink may be any one or more of various different inks described herein and, further or instead, may include any material having a phase controllably distributable to the one or more layers as part of a layer-by-layer binder jetting process. Thus, for example, the ink may be any material deliverable (e.g., jettable) from a nozzle of a printhead moving over the one or more layers. Further, or instead, the ink may chemically react with the at least one binder to form an active component having a composition and concentration suitable for producing an appropriate gradient in one or more physicochemical properties of a three-dimensional part. In general, deposition of the ink to form the active component along target locations of one or more layers to chemically react with the at least one binder may be particularly useful for forming the active component in situ as a layer-by-layer binder jetting process is carried out to form the object. Such in situ formation of the active component may, for example, reduce material handling requirements as compared to maintaining stability of an active component that includes particles. Additionally, or alternatively, the chemical reaction of the ink with the at least one binder may produce advantageous changes in the at least one binder. For example, the binder may include a colloid of a finely divided inorganic element that is stable only in a finely dispersed form that may be undesirable for thermal processing. Continuing with this example, the ink may chemically react with the finely divided inorganic element, prior to thermal processing, to form an active component including an aggregate the finely divided inorganic element, with this aggregate being more suitable for thermal processing. Further, or instead, chemical modification of the at least one binder at target locations in at least one layer may facilitate achieving modifications that may not otherwise be achievable through local delivery of an active component including particles.

In certain implementations, the at least one binder may include a salt (e.g., vanadium salt), and the chemical modification produced by depositing the ink on the salt may change volatility of the salt. In such implementations, the salt with the altered volatility is the active component, as this altered salt may respond differently to subsequent processing as compared to the salt with unaltered volatility. In certain instances, the ink may include an ionic solution (e.g., an ionic solution including vanadium chloride) that increases volatility of the salt. Additionally, or alternatively, the ink may include an ionic solution that decreases volatility of the vanadium salt.

While chemical modification of the at least one binder has been described as changing volatility of the binder, other types of volatility-related changes are additionally or alternatively possible. For example, chemical modification of the binder through selective deposition of the ink may include changing a volatility response of the binder to thermal processing. Continuing with this example, in areas of changed volatility response of the binder, the binder may be debound differently than the binder in areas of unchanged volatility response. In turn, such variation in the debinding characteristics of the binder along the object may produce a gradient in one or more physicochemical properties in the three-dimensional part formed from thermally processing the object.

As shown in step 908, the exemplary method 900 may include thermally processing the object into a three-dimensional part having, in at least an area of the three-dimensional part corresponding to the active component of the object, a gradient of one or more physicochemical properties of a material at least partially formed from thermally processing the inorganic particles and the active component of the object. In general, thermally processing the object may be carried out using any one or more of the various different thermal processing techniques described herein. Accordingly, thermally processing the object may include sintering the object, infiltrating the object with an infiltrant (e.g., a liquid metal), or a combination thereof.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for forming an object, comprising:
   depositing a first layer of powder along a powder bed, the depositing comprising spreading the layer of powder along the powder bed, the powder including inorganic particles;
   depositing, via a first printhead, a first layer of binder along a portion of the first layer of powder, the depositing comprising jetting via the first printhead, the first layer of binder along the first layer of powder;
   depositing, via a second printhead, an additive along the first layer of powder and the first layer of binder, the additive including an active component and wherein the additive is selected from the group consisting of chromium, tungsten, manganese, nickel and molybdenum;
   forming, with the binder, layer of powder, and the active component, an object; and
   thermally processing the object into a three-dimensional part, the three-dimensional part including, in an area corresponding to a distribution of the active component of the object, a physicochemical gradient at least partially formed from thermally processing the inorganic particles and the active component of the object.

2. The method of claim 1, wherein the method further comprises, before the forming step:
   depositing a second layer of powder along the powder bed;
   depositing, via the first printhead, a second layer of binder along the second layer of powder, the depositing comprising jetting via the first printhead, the first layer of binder along the first layer of powder;
   depositing, via the second printhead, the additive along the second layer of powder and the second layer of binder.

3. The method of claim 1, wherein the method further comprises placing the active component in a carrier.

4. The method of claim 3, wherein, upon being placed in the carrier, the active component remains undissolved and suspended in the carrier.

5. The method of claim 3, wherein the carrier includes a solvent selected from the group consisting of water, an aromatic organic substance, an aliphatic organic substance, alcohol, and a surfactant.

6. The method of claim 5, wherein the active component is dissolved in the solvent.

7. The method of claim 1, wherein the thermal processing further comprises chemically reacting the inorganic particles with one or more process gasses.

8. The method of claim 1, further comprising depositing a second layer of powder.

9. The method of claim 1, wherein the one or more binders are deposited to the plurality of layers of the powder between formation of successive layers of the plurality of layers of the powder.

10. A method for delivering a plurality of fluids to form an object, comprising:
    depositing a first layer of a plurality of layers of a powder along a powder bed, the powder including inorganic particles;
    jetting, via a first printhead, a first layer of binder along a portion of the first layer of the powder;
    jetting, via a second printhead, an additive along the first layer of the powder, wherein the additive includes one or more of carbon black, graphene, carbon nanotubes, boron or silicon carbide;
    forming, with the binder, the layer of powder, and the additive, an object; and
    thermally processing the object into a three-dimensional part, the three-dimensional part including, in an area corresponding to a distribution of the additive of the object, a physicochemical gradient at least partially formed from thermally processing the inorganic particles and the additive of the object.

11. The method of claim 10, wherein the additive is selected from the group consisting of an active component, a salt, and a first polymer and an active component attached to the first polymer.

12. The method of claim 10, wherein the additive comprises an ink, the ink chemically modifying the binder to form an active component.

13. The method of claim 10, wherein the inorganic particles include at least one of ceramic particles or metallic particles.

14. The method of claim 10, wherein the one or more binders include at least one of a polymer, a salt, nanoparticles, or a gel.

15. The method of claim 10, wherein the first layer of binder include a first binder, the additive further comprising a second binder different from the first binder.

* * * * *